(12) United States Patent
Oodachi et al.

(10) Patent No.: US 7,680,452 B2
(45) Date of Patent: Mar. 16, 2010

(54) REPEATER

(75) Inventors: Toshiaki Oodachi, Kanagawa (JP);
Keisho Fujiwara, Kanagawa (JP);
Masashi Shiohara, Kanagawa (JP);
Naoki Uchida, Kanagawa (JP);
Takayoshi Morino, Kanagawa (JP);
Fumitoshi Goto, Chiba (JP)

(73) Assignee: Panasonic Corporation, Osaka (JP)

( * ) Notice: Subject to any disclaimer, the term of this patent is extended or adjusted under 35 U.S.C. 154(b) by 369 days.

(21) Appl. No.: 11/577,558

(22) PCT Filed: Oct. 19, 2005

(86) PCT No.: PCT/JP2005/019203
§ 371 (c)(1),
(2), (4) Date: Apr. 19, 2007

(87) PCT Pub. No.: WO2006/043592
PCT Pub. Date: Apr. 27, 2006

(65) Prior Publication Data
US 2007/0243823 A1    Oct. 18, 2007

(30) Foreign Application Priority Data

| Oct. 20, 2004 | (JP) | ............................. 2004-306096 |
| Oct. 25, 2004 | (JP) | ............................. 2004-309301 |
| Dec. 13, 2004 | (JP) | ............................. 2004-359998 |

(51) Int. Cl.
*H04B 7/15* (2006.01)
(52) U.S. Cl. ................... 455/11.1; 455/13.1; 455/24; 455/62
(58) Field of Classification Search ............... 455/447, 455/11.1, 63.1, 916, 20, 23, 62, 75, 67.11, 455/446, 464, 9, 13.1, 13.3, 15, 16, 24
See application file for complete search history.

(56) References Cited

U.S. PATENT DOCUMENTS 6,690,915 B1 *  2/2004  Ito et al. ..................... 455/7

(Continued)

FOREIGN PATENT DOCUMENTS

JP          200169091         3/2001

(Continued)

OTHER PUBLICATIONS

PCT International Search Report dated Jan. 24, 2006.

(Continued)

*Primary Examiner*—John Lee
(74) *Attorney, Agent, or Firm*—Dickinson Wright PLLC

(57) ABSTRACT

A booster capable of preventing itself from adversely influencing a base station. This booster comprises a plurality of downstream signal amplifying parts (111-1 to 111-4) and a plurality of upstream signal amplifying parts (112-1 to 112-4). A received signal analyzing part (116) analyzes the perch channel information of a signal received from a base station to generate analysis information. When the analysis information shows that the reception quality of the received signal is below a threshold value, halt control parts (118,124) halts the operations of those ones of the downstream signal amplifying parts (111-1 to 111-4) and upstream signal amplifying parts (112-1 to 112-4) that are related to that analysis information. When the analysis information shows that a path-loss value or a base station interference power is above a threshold value, the halt control parts (118,124) may halt the operations of those ones of the downstream signal amplifying parts (111-1 to 111-4) and upstream signal amplifying parts (112-1 to 112-4) that are related to that analysis information.

12 Claims, 16 Drawing Sheets

U.S. PATENT DOCUMENTS 7,480,485 B1 * 1/2009 Oh et al. ............ 455/7
2007/0155314 A1 * 7/2007 Mohebbi ............ 455/11.1

FOREIGN PATENT DOCUMENTS

JP        2002171215       6/2002

OTHER PUBLICATIONS

PCT International Search Report dated Jan. 24, 2006.

* cited by examiner

REPEATER

TECHNICAL FIELD

The present invention relates to a repeater which amplifies a signal transmitted/received between a base station and a mobile communication apparatus.

BACKGROUND ART

A conventional repeater is described in Patent Document 1. The repeater described in this Patent Document 1 controls gain of amplification (amplification factor) of a transmitted or received signal.

Patent Document 1: Japanese Patent Application Laid-Open No. 2001-69091

DISCLOSURE OF INVENTION

Problems to be Solved by the Invention

However, even when the reception quality of a received signal is poor, the conventional repeater amplifies the signal and also amplifies noise, and therefore there is a problem of having a negative influence on a base station.

It is therefore an object of the present invention to provide a repeater which has no negative influence on the base station.

Means for Solving the Problem

The repeater according to the present invention is a repeater provided with at least one downlink signal amplification section and at least one uplink signal amplification section, adopts a configuration including: a received signal analysis section that analyzes information of a broadcast channel of a received signal from a base station to generate analysis information; and an output control section that controls whether or not to output a signal from the uplink signal amplification section and the downlink signal amplification section based on a communication quality indicated by the analysis information.

ADVANTAGEOUS EFFECT OF THE INVENTION

The present invention controls output of signals from the uplink signal amplification section and the downlink signal amplification section based on the communication quality, and therefore has no negative influence on the base station.

BEST MODE FOR CARRYING OUT THE INVENTION

Next, embodiments of the present invention will be described in detail with reference to the accompanying drawings.

Embodiment 1

Figure 1:
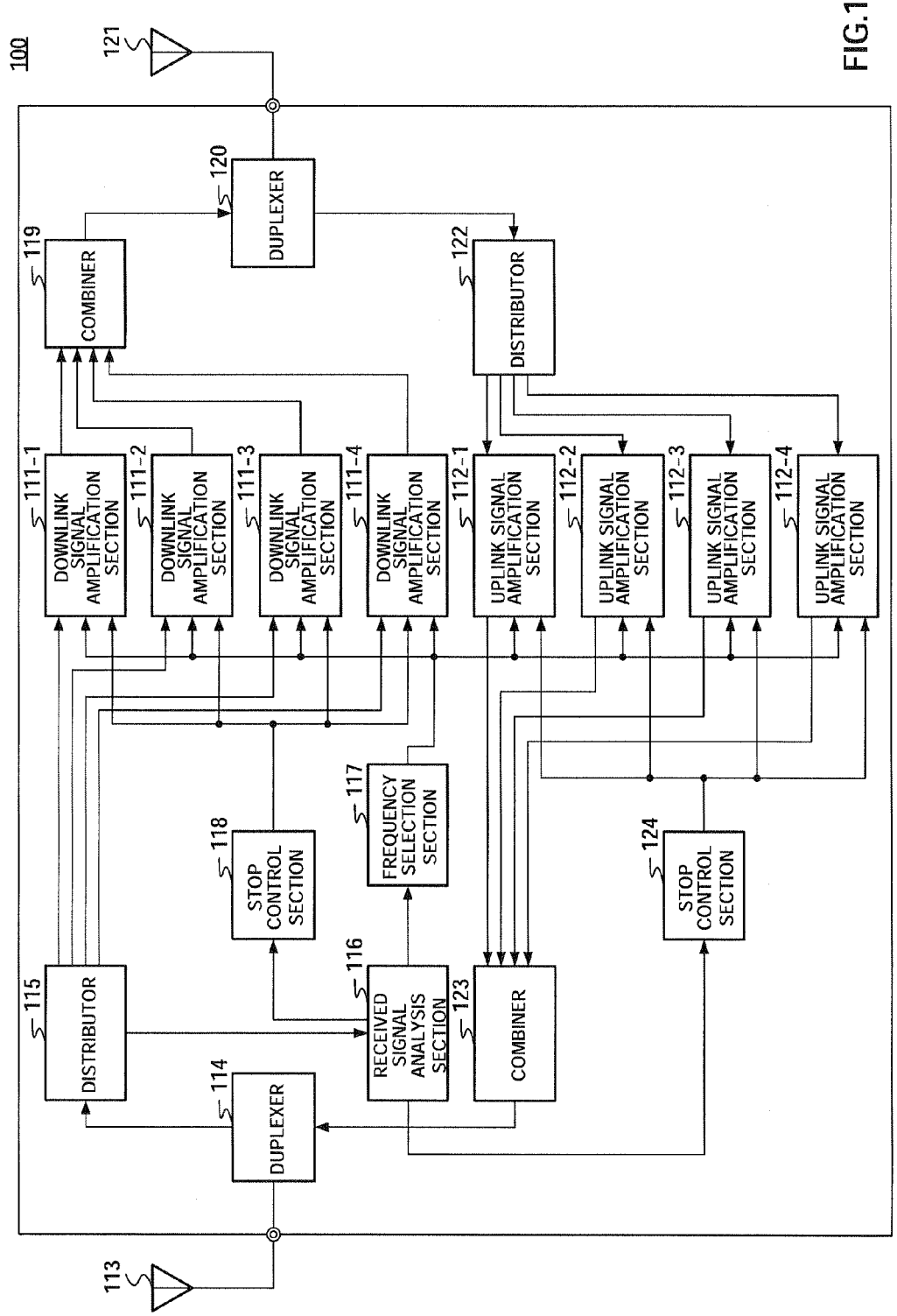
FIG. 1 is a block diagram showing the configuration of a repeater according to Embodiment 1 of the present invention.

FIG. 1 is a block diagram showing the configuration of a repeater according to Embodiment 1 of the present invention. As shown in FIG. 1, repeater 100 according to Embodiment 1 of the present invention is provided with a plurality of downlink signal amplification sections 111-1 to 111-4, a plurality of uplink signal amplification sections 112-1 to 112-4, outdoor antenna 113, duplexer 114, distributor 115, received signal analysis section 116, frequency selection section 117, stop control section 118, combiner 119, duplexer 120, indoor antenna 121, distributor 122, combiner 123 and stop control section 124.

Outdoor antenna 113 transmits/receives a signal to/from a base station which is located outdoors. Outdoor antenna 113 receives a downlink signal (downlink radio signal) from the base station, generates a downlink received signal, and gives the signal to a plurality of downlink signal amplification sections 111-1 to 111-4 through duplexer 114 and distributor 115. Furthermore, outdoor antenna 113 receives an uplink signal from a plurality of uplink signal amplification sections 112 through combiner 123 and duplexer 114 and transmits the signal to the base station as an uplink radio signal.

Distributor 115 distributes the downlink signal received from the base station through outdoor antenna 113 and duplexer 114 to a plurality of downlink signal amplification sections 111-1 to 111-4 and received signal analysis section 116.

A plurality of downlink signal amplification sections 111-1 to 111-4 amplify the downlink signal from distributor 115 at predetermined gain of amplification (amplification factor) and give the result to combiner 119. Combiner 119 combines the downlink signals from the plurality of downlink signal amplification sections 111-1 to 111-4 and gives the combined signal to duplexer 120.

Duplexer 120 receives the downlink signal from combiner 119 and gives it to indoor antenna 121. Indoor antenna 121 receives the downlink signal from combiner 119 through duplexer 120 and transmits it to a communication terminal apparatus as a downlink radio signal. Furthermore, duplexer 120 receives an uplink signal from the communication terminal apparatus and gives it to distributor 122. Distributor 122 distributes the uplink signal received from the communication terminal apparatus through indoor antenna 121 and duplexer 120 to a plurality of uplink signal amplification sections 112-1 to 112-4.

The plurality of uplink signal amplification sections 112-1 to 112-4 amplify the uplink signal received from the communication terminal apparatus through indoor antenna 121, duplexer 120 and distributor 122 at a predetermined amplification factor and give the signals to combiner 123. Combiner 123 combines the uplink signals from the plurality of uplink signal amplification sections 112-1 to 112-4 and gives the combined signal to duplexer 114.

Duplexer 114 receives the uplink signal from combiner 123 and gives it to outdoor antenna 113. Outdoor antenna 113 receives the uplink signal from combiner 123 through duplexer 114 and transmits it to the base station as an uplink radio signal.

Received signal analysis section 116 receives the downlink signal from the base station through outdoor antenna 113, duplexer 114 and distributor 115. Received signal analysis section 116 analyzes information of a broadcast channel of the downlink signal (received signal), generates analysis information, and gives it to frequency selection section 117 and stop control sections 118 and 124. This analysis information includes frequency selection information which is information to select a frequency and reception quality information which is information indicating a reception quality (communication quality) of the received signal.

Frequency selection section 117 receives the analysis information from received signal analysis section 116, selects frequencies to be allocated to the plurality of downlink signal amplification sections 111-1 to 111-4 and the plurality of uplink signal amplification sections 112-1 to 112-4 based on the frequency selection information of this analysis information and generates frequency selection signals and gives these signals to the plurality of downlink signal amplification sections 111-1 to 111-4 and the plurality of uplink signal amplification sections 112-1 to 112-4.

Stop control section 118 which is an output control section receives the analysis information from received signal analysis section 116 and controls operation of the plurality of downlink signal amplification sections 111-1 to 111-4 based on the reception quality information of this analysis information. When the reception quality information of the analysis information indicates that the reception quality according to the reception quality information is equal to or below a threshold, stop control section 118 performs control so as to stop the operation of downlink signal amplification sections 111-1 to 111-4 according to the reception quality information and prevent a signal from being outputted.

Furthermore, stop control section 124 receives the analysis information from received signal analysis section 116 and controls operation of the plurality of uplink signal amplification sections 112-1 to 112-4 based on the reception quality information of this analysis information. When the reception quality information of the analysis information indicates that the reception quality according to the above-described reception quality information is equal to or below a threshold, stop control section 124 stops the operation of uplink signal amplification sections 112-1 to 112-4 according to the reception quality information.

Figure 2:
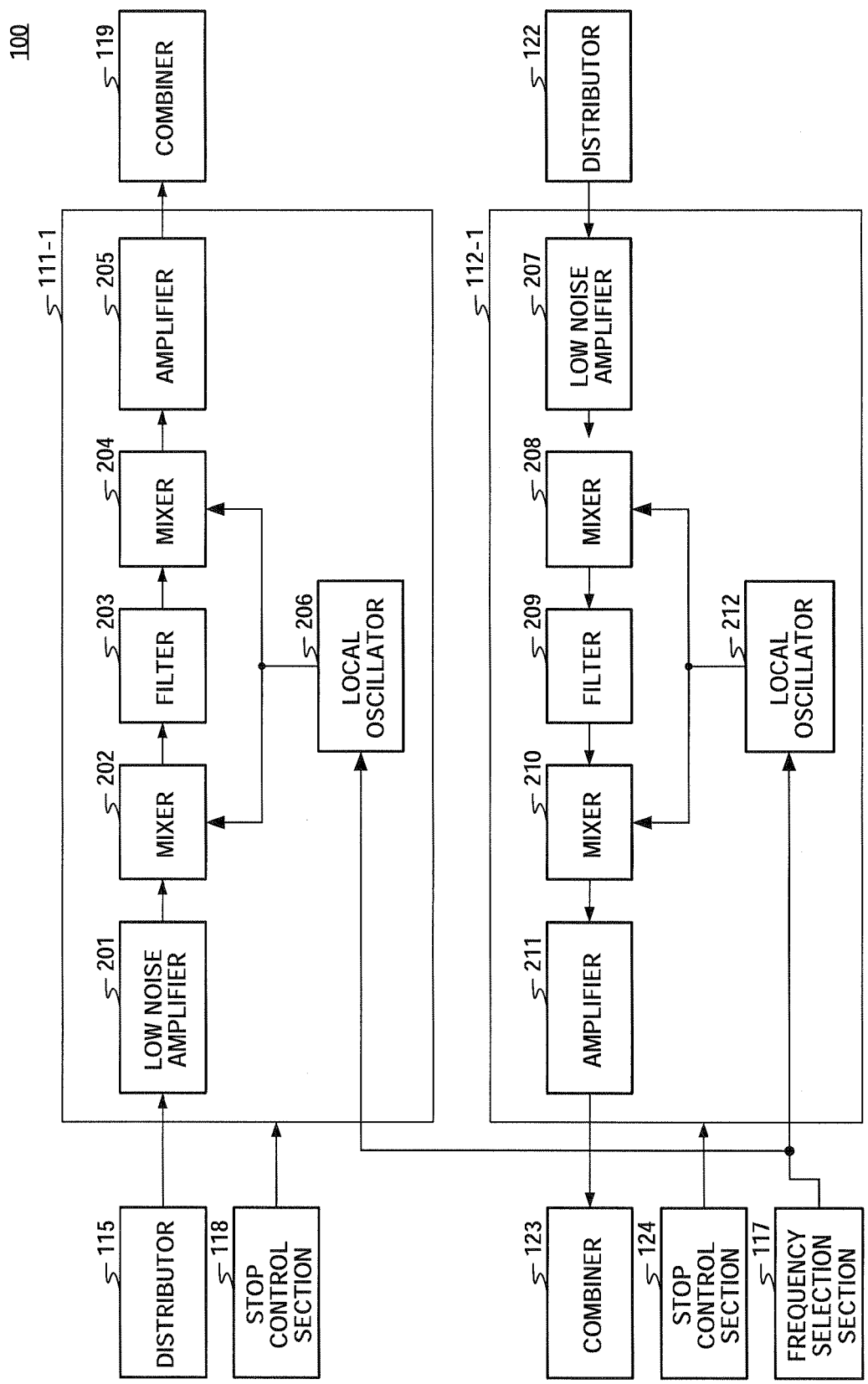
FIG. 2 is a block diagram showing the configuration of a downlink signal amplification section and an uplink signal amplification section of the repeater according to Embodiment 1 of the present invention.

Next, downlink signal amplification section 111-1 and uplink signal amplification section 112-1 of repeater 100 according to Embodiment 1 of the present invention will be explained in detail with reference to the drawings. FIG. 2 is a block diagram showing the configurations of downlink signal amplification section 111-1 and uplink signal amplification section 112-1 of repeater 100 according to Embodiment 1 of the present invention.

Downlink signal amplification section 111-1 is provided with low noise amplifier 201, mixer 202, filter 203, mixer 204, amplifier 205 and local oscillator 206. Uplink signal amplification section 112-1 is provided with low noise amplifier 207, mixer 208, filter 209, mixer 210, amplifier 211 and local oscillator 212.

Local oscillator 206 receives a frequency selection signal from frequency selection section 117, generates a local frequency signal in response to this frequency selection signal, and gives it to mixers 202 and 204. On the other hand, local oscillator 212 receives a frequency selection signal from frequency selection section 117, generates a local frequency signal in response to this frequency selection signal, and gives it to mixers 208, 210.

Low noise amplifier 201 amplifies a downlink signal received from the base station through outdoor antenna 113, duplexer 114 and distributor 115 at a predetermined amplification factor and gives the result to mixer 202. Mixer 202 mixes the downlink signal from low noise amplifier 201 and the local frequency signal from local oscillator 206, generates a downlink signal with a converted frequency, and gives it to filter 203.

Filter 203 allows only a downlink signal in one frequency band out of the downlink signals from mixer 202 to pass. Mixer 204 mixes the downlink signal from filter 203 and the local frequency signal from local oscillator 206, generates a downlink signal converted to the same frequency as the input frequency, and gives it to amplifier 205. Amplifier 205 amplifies the downlink signal from mixer 204 at a predetermined amplification factor and gives it to combiner 119.

Low noise amplifier 207 amplifies an uplink signal received from the communication terminal apparatus through indoor antenna 121, duplexer 120 and distributor 122 at a predetermined amplification factor and gives it to mixer 208. Mixer 208 mixes the uplink signal from low noise amplifier 207 and the local frequency signal from local oscillator 212, generates an uplink signal with a converted frequency, and gives it to filter 209.

Filter 209 allows only an uplink signal in one frequency band out of the uplink signals from mixer 208 to pass. Mixer 210 mixes the uplink signal from filter 209 and the local frequency signal from local oscillator 212, generates an uplink signal converted to the same frequency as the input frequency, and gives it to amplifier 211. Amplifier 211 amplifies the uplink signal from mixer 210 at a predetermined amplification factor and gives it to combiner 123.

Each of downlink signal amplification sections 111-2 to 111-4 has the same configuration as that of downlink signal amplification section 111-1.

Furthermore, each of uplink signal amplification sections 112-2 to 112-4 has the same configuration as that of uplink signal amplification section 112-1.

Embodiment 2

Figure 3:
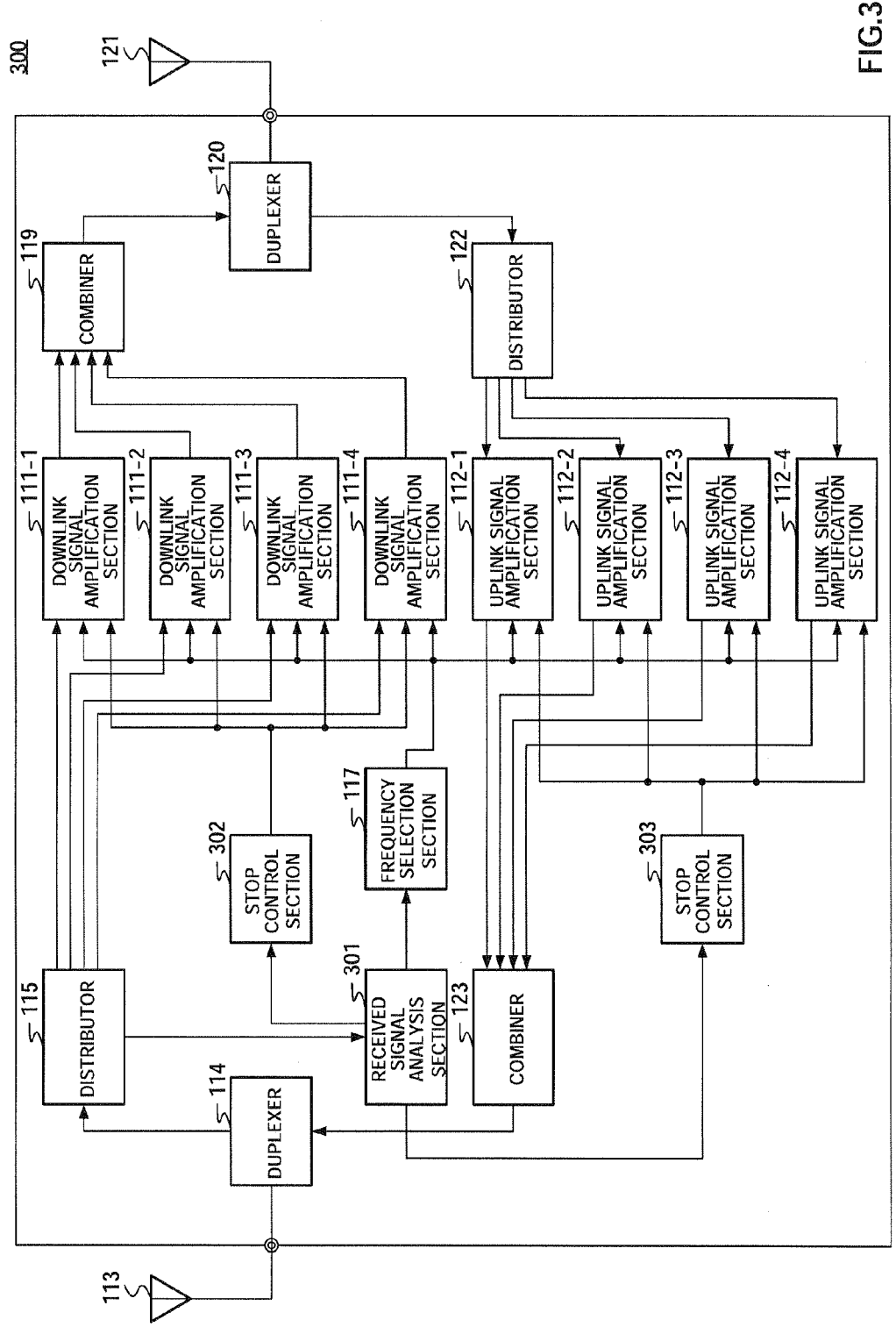
FIG. 3 is a block diagram showing the configuration of a repeater according to Embodiment 2 of the present invention.

Next, Embodiment 2 of the present invention will be explained with reference to the accompanying drawings. FIG. 3 is a block diagram showing the configuration of a repeater according to Embodiment 2 of the present invention. In Embodiment 2 of the present invention, the same components as those in Embodiment 1 of the present invention will be assigned the same reference numerals without further explanations.

As shown in FIG. 3, repeater 300 according to Embodiment 2 of the present invention has received signal analysis section 301 and stop control sections 302 and 303 instead of received signal analysis section 116 and stop control sections 118 and 124 in Embodiment 1 of the present invention.

That is, repeater 300 according to Embodiment 2 of the present invention is provided with a plurality of downlink signal amplification sections 111-1 to 111-4, a plurality of uplink signal amplification sections 112-1 to 112-4, outdoor antenna 113, duplexer 114, distributor 115, received signal analysis section 301, frequency selection section 117, stop control section 302, combiner 119, duplexer 120, indoor antenna 121, distributor 122, combiner 123 and stop control section 303.

Next, the operation of repeater 300 of Embodiment 2 of the present invention which is different from that of repeater 100 according to Embodiment 1 of the present invention will be explained.

Received signal analysis section 301 receives a downlink signal from the base station through outdoor antenna 113, duplexer 114 and distributor 115. Received signal analysis section 301 analyzes information of a broadcast channel of the downlink signal (received signal), generates analysis information, and gives it to frequency selection section 117 and stop control sections 302 and 303. This analysis information includes frequency selection information and path loss value information which is information indicating attenuated power (communication quality) in the propagation path of the received signal.

Stop control section 302 which is an output control section receives the analysis information from received signal analysis section 301 and controls the operation of the plurality of downlink signal amplification sections 111-1 to 111-4 based on the path loss value information of this analysis information. When the path loss value information of the analysis information indicates that the path loss value is equal to or above a threshold, stop control section 302 performs control so as to stop the operation of the downlink signal amplification sections 111-1 to 111-4 according to the path loss value information and prevent a signal from being outputted.

On the other hand, stop control section 303 receives the analysis information from received signal analysis section 301 and controls the operation of the plurality of uplink signal amplification sections 112-1 to 112-4 based on the path loss value information of this analysis information. When the path loss value information of the analysis information indicates that the path loss value is equal to or above a threshold, stop control section 303 stops the operation of downlink signal amplification sections 112-1 to 112-4 according to the path loss value information.

Embodiment 3

Figure 4:
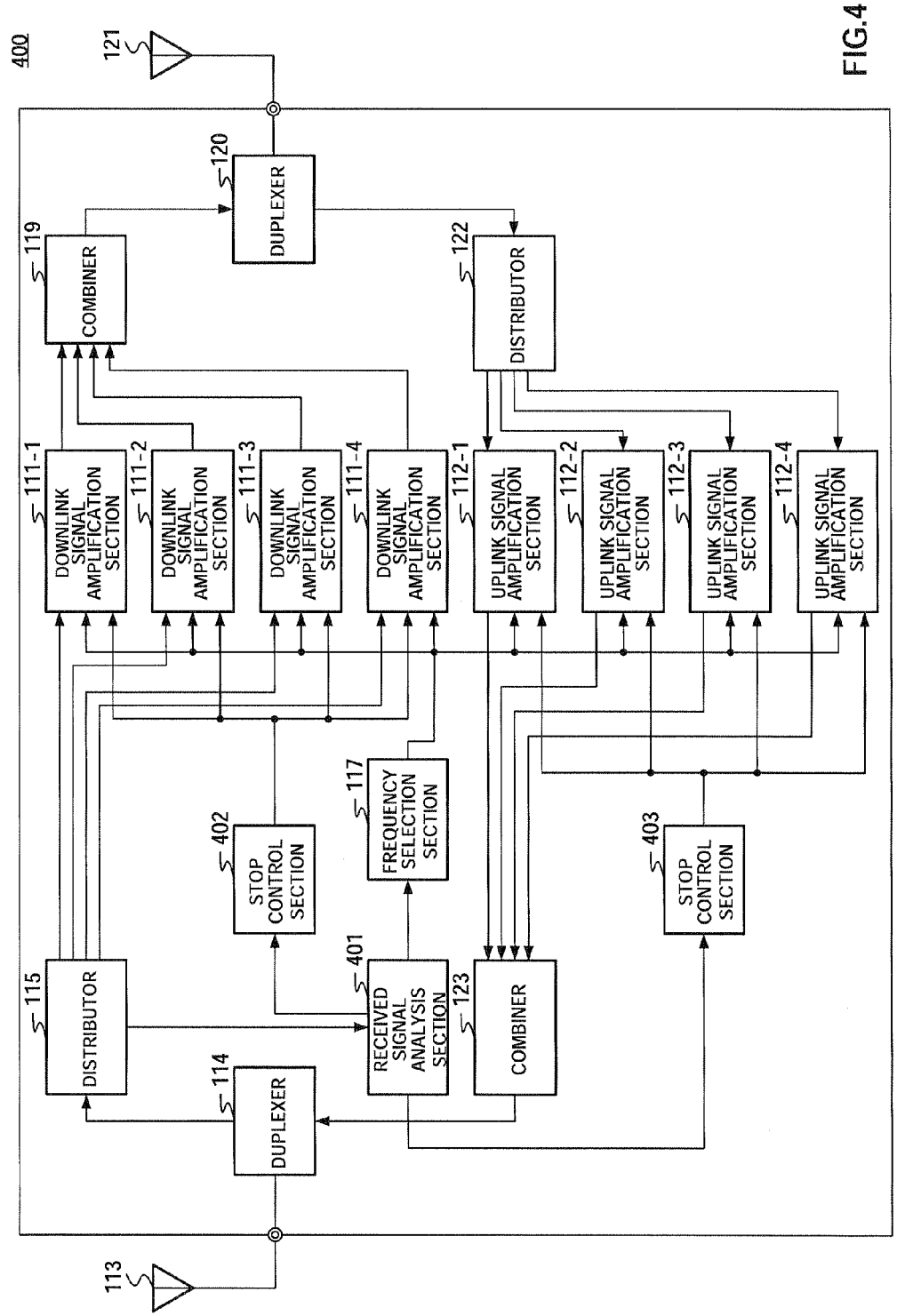
FIG. 4 is a block diagram showing the configuration of a repeater according to Embodiment 3 of the present invention.

Next, Embodiment 3 of the present invention will be explained with reference to the accompanying drawings. FIG. 4 is a block diagram showing the configuration of a repeater according to Embodiment 3 of the present invention. In Embodiment 3 of the present invention, the same components as those in Embodiment 1 of the present invention will be assigned the same reference numerals without further explanations.

As shown in FIG. 4, repeater 400 according to Embodiment 3 of the present invention has received signal analysis section 401 and stop control sections 402 and 403 instead of received signal analysis section 116 and stop control sections 118 and 124 in Embodiment 1 of the present invention.

That is, repeater 400 according to Embodiment 3 of the present invention is provided with a plurality of downlink signal amplification sections 111-1 to 111-4, a plurality of uplink signal amplification sections 112-1 to 112-4, outdoor antenna 113, duplexer 114, distributor 115, received signal analysis section 401, frequency selection section 117, stop control section 402, combiner 119, duplexer 120, indoor antenna 121, distributor 122, combiner 123 and stop control section 403.

Next, the operation of repeater 400 according to Embodiment 3 of the present invention which is different from that of repeater 100 according to Embodiment 1 of the present invention will be explained.

Received signal analysis section 401 receives a downlink signal from a base station through outdoor antenna 113, duplexer 114 and distributor 115. Received signal analysis section 401 analyzes information of a broadcast channel of the downlink signal (received signal), generates analysis information, and gives it to frequency selection section 117 and stop control sections 402 and 403. This analysis information has frequency selection information and base station interference power information indicating information of the base station interference power (communication quality) of the received signal.

Stop control section 402 which is an output control section receives the analysis information from received signal analysis section 401 and controls operation of the plurality of downlink signal amplification sections 111-1 to 111-4 based on the base station interference power information of this analysis information. When the base station interference power information of the analysis information indicates that the base station interference power is equal to or above a threshold, stop control section 402 performs control so as to stop the operation of downlink signal amplification sections 111-1 to 111-4 according to the base station interference power information and prevent a signal from being outputted.

Furthermore, stop control section 403 receives the analysis information from received signal analysis section 401 and controls the operation of the plurality of uplink signal amplification sections 112-1 to 112-4 based on the base station interference power information of this analysis information. When the base station interference power information of the analysis information indicates that the base station interference power is equal to or above a threshold, stop control section 403 stops the operation of the uplink signal amplification sections 112-1 to 112-4 according to the base station interference power information.

The present invention can be applied to a repeater which has one uplink signal amplification section and one uplink signal amplification section in Embodiments 1 to 3 of the present invention.

Embodiment 4

Figure 5:
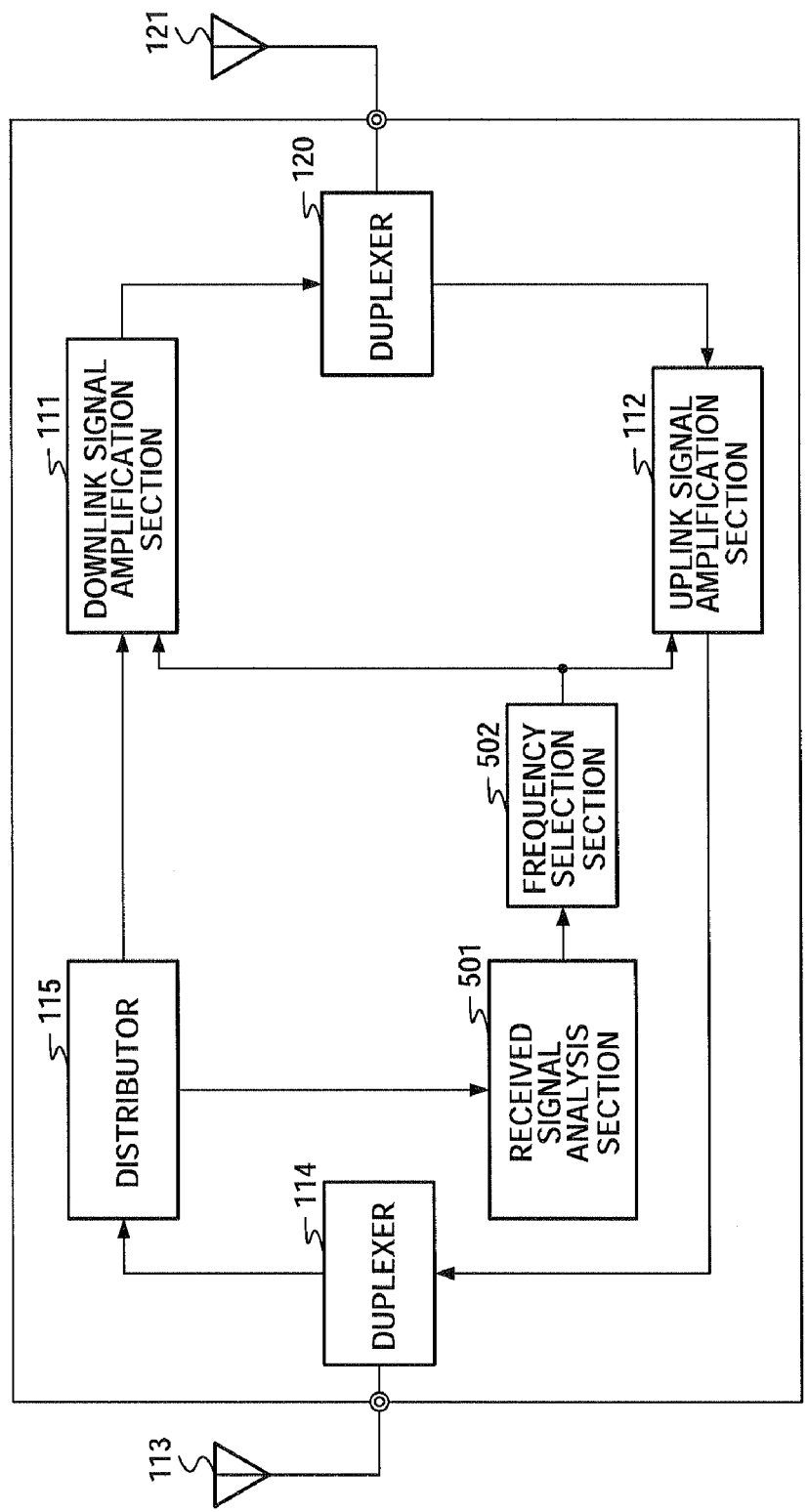
FIG. 5 is a block diagram showing the configuration of a repeater according to Embodiment 4 of the present invention.

Next, Embodiment 4 of the present invention will be explained with reference to the attached drawings. FIG. 5 is a block diagram showing the configuration of a repeater according to Embodiment 4 of the present invention. In Embodiment 4 of the present invention, the same components as those in Embodiment 1 of the present invention will be assigned the same reference numerals without further explanations.

As shown in FIG. 5, repeater 500 according to Embodiment 4 of the present invention is provided with downlink signal amplification section 111, uplink signal amplification section 112, outdoor antenna 113, duplexer 114, distributor 115, received signal analysis section 501, frequency selection section 502, duplexer 120 and indoor antenna 121.

Downlink signal amplification section 111 has the same configuration as that of downlink signal amplification section 111-1. Uplink signal amplification section 112 has the same configuration as that of uplink signal amplification section 112-1.

Next, the operation of repeater 500 according to Embodiment 4 of the present invention which is different from that of repeater 100 according to Embodiment 1 of the present invention will be explained.

Distributor 115 distributes a downlink signal received from a base station through outdoor antenna 113 and duplexer 114 to a plurality of downlink signal amplification sections 111 and received signal analysis section 501.

The plurality of downlink signal amplification sections 111 amplify the downlink signal from distributor 115 at predetermined gain of amplification (amplification factor) and give the result to duplexer 120.

Duplexer 120 receives the downlink signal from downlink signal amplification section 111 and gives it to indoor antenna 121. Indoor antenna 121 receives the downlink signal from downlink signal amplification section 111 through duplexer 120 and transmits it to a communication terminal apparatus as a downlink radio signal. Furthermore, duplexer 120 receives an uplink signal from the communication terminal apparatus and gives it to uplink signal amplification section 112.

Uplink signal amplification section 112 amplifies the uplink signal received from the communication terminal apparatus through indoor antenna 121 and duplexer 120 at a predetermined amplification factor and gives the result to duplexer 114.

Duplexer 114 receives the uplink signal from uplink signal amplification section 112 and gives it to outdoor antenna 113. Outdoor antenna 113 receives the uplink signal from uplink signal amplification section 112 through duplexer 114 and transmits it to the base station as an uplink radio signal.

Received signal analysis section 501 receives the downlink signal from the base station through outdoor antenna 113, duplexer 114 and distributor 115. Received signal analysis section 501 analyzes information of a broadcast channel of the downlink signal (received signal), generates analysis information, and gives the analysis information to frequency selection section 502. This analysis information has frequency selection information.

Frequency selection section 502 which is an output control section receives the analysis information from received signal analysis section 501, selects amplification frequencies to be allocated to downlink signal amplification section 111 and uplink signal amplification section 112 based on the frequency selection information of this analysis information, generates frequency selection signals, and gives them to downlink signal amplification section 111 and uplink signal amplification section 112. Downlink signal amplification section 111 and uplink signal amplification section 112 output only signals in the amplification frequency band which correspond to the frequency selection signals.

Figure 6:
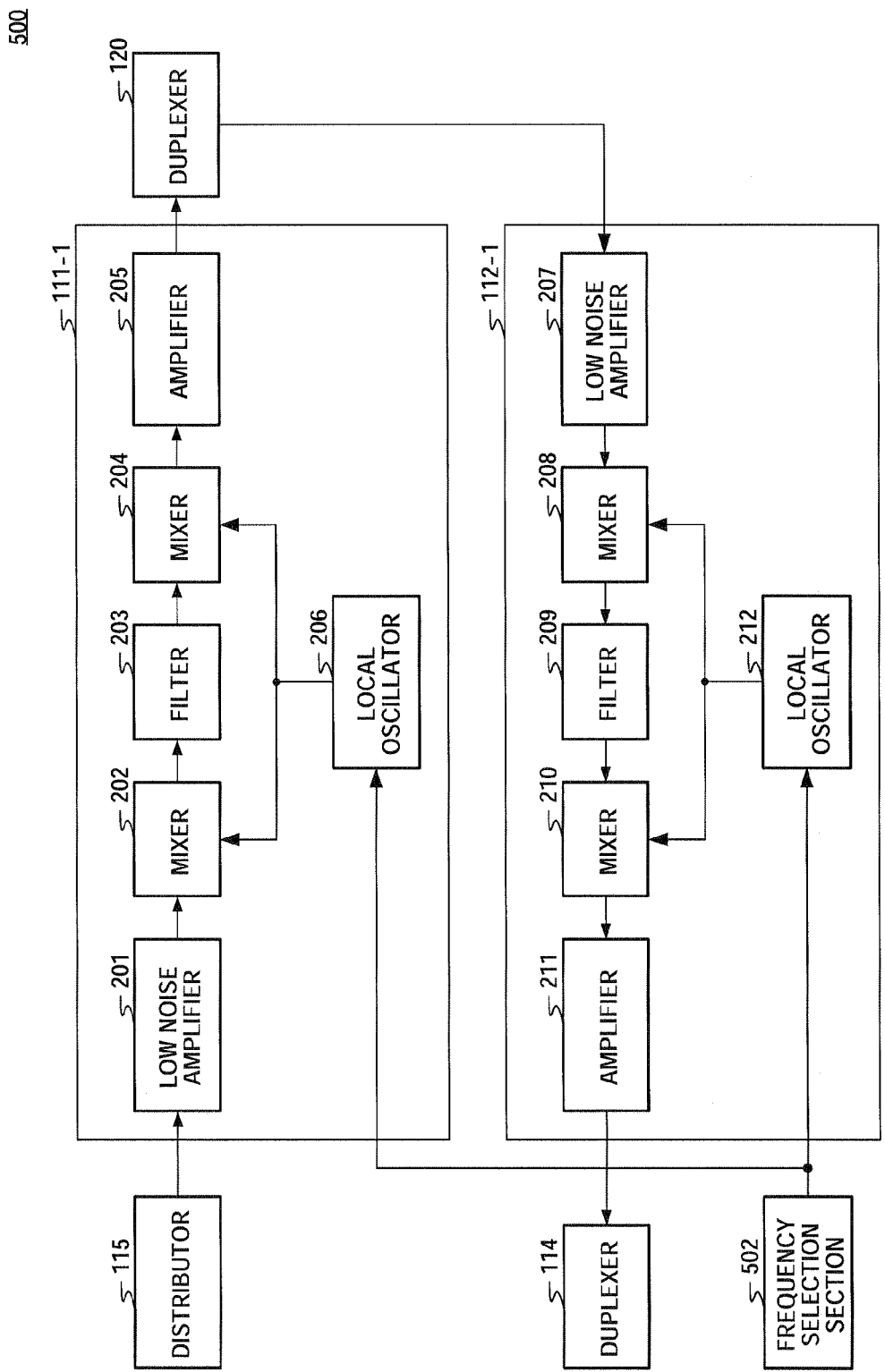
FIG. 6 is a block diagram showing the configuration of a downlink signal amplification section and an uplink signal amplification section of the repeater according to Embodiment 4 of the present invention.

Next, downlink signal amplification section 111 and uplink signal amplification section 112 of repeater 500 according to Embodiment 4 of the present invention will be explained in detail with reference to the accompanying drawings. FIG. 6 is a block diagram showing the configurations of downlink signal amplification section 111 and uplink signal amplification section 112 of repeater 500 according to Embodiment 4 of the present invention.

Downlink signal amplification section 111 is provided with low noise amplifier 201, mixer 202, filter 203, mixer 204, amplifier 205 and local oscillator 206. Uplink signal amplification section 112 is provided with low noise amplifier 207, mixer 208, filter 209, mixer 210, amplifier 211 and local oscillator 212.

Local oscillator 206 receives a frequency selection signal from frequency selection section 502, generates a local frequency signal in response to this frequency selection signal, and gives it to mixers 202 and 204. On the other hand, local oscillator 212 receives a frequency selection signal from frequency selection section 502, generates a local frequency signal in response to this frequency selection signal, and gives it to mixers 208 and 210.

Low noise amplifier 201 amplifies a downlink signal received from the base station through duplexer 114 and distributor 115 at a predetermined amplification factor and gives the result to mixer 202. Mixer 202 mixes the downlink signal from low noise amplifier 201 and the local frequency signal from local oscillator 206, generates a downlink signal with a converted frequency, and gives it to filter 203.

Filter 203 allows only a downlink signal in one frequency band out of downlink signals from mixer 202 to pass. Mixer 204 mixes the downlink signal from filter 203 and the local frequency signal from local oscillator 206, generates a downlink signal converted to the same frequency as the input frequency, and gives it to amplifier 205. Amplifier 205 amplifies the downlink signal from mixer 204 at a predetermined amplification factor and gives the result to duplexer 120.

Low noise amplifier 207 amplifies an uplink signal received from the communication terminal apparatus through indoor antenna 121 and duplexer 120 at a predetermined amplification factor and gives the result to mixer 208. Mixer 208 mixes the uplink signal from low noise amplifier 207 and the local frequency signal from local oscillator 212, generates an uplink signal with a converted frequency, and gives it to filter 209.

Filter 209 allows only an uplink signal in one frequency band out of uplink signals from mixer 208 to pass. Mixer 210 mixes the uplink signal from filter 209 and the local frequency signal from local oscillator 212, generates an uplink signal converted to the same frequency as the input frequency, and gives it to amplifier 211. Amplifier 211 amplifies the uplink signal from mixer 210 at a predetermined amplification factor and gives the result to duplexer 114.

In repeater 500 according to Embodiment 4 of the present invention, frequency selection section 502 receives analysis information from received signal analysis section 501, selects amplification frequencies to be allocated to downlink signal amplification section 111 and uplink signal amplification section 112 based on the frequency selection information of this analysis information, generates frequency selection signals, and gives them to downlink signal amplification section 111 and uplink signal amplification section 112. Downlink signal amplification section 111 and uplink signal amplification section 112 output only signals in the amplification frequency band which correspond to the frequency selection signals. Next, the configuration and the operation of repeater 500 according to Embodiment 4 of the present invention will be explained more specifically.

In the following explanations, the central frequency of filter 203 of downlink signal amplification section 111 is assumed as IF and the frequency selected by frequency selection section 502 (amplification frequency) is assumed as RF.

In order to select a frequency, frequency L0 outputted at local oscillator 206 is assumed as RF−IF or RF+IF. By changing this frequency L0, it is possible to select a frequency (amplification frequency).

Upon receiving the input signals of frequency L0 and frequency RF, mixer 202 outputs an output signal of frequency (RF−IF). Therefore, when the frequency (RF−IF or RF+IF) which is outputted from local oscillator 206 is substituted into frequency L0, the frequency which is outputted from mixer 202 becomes RF−(RF−IF)=IF. Therefore, the central frequency of filter 203 becomes IF. Therefore, the frequency which passes through filter 203 becomes only IF and given to mixer 204.

Upon receiving the input signals of frequency L0 and frequency IF, mixer 204 outputs an output signal of frequency (L0+IF). Therefore, when the frequency (RF−IF or RF+IF) which is outputted from local oscillator 206 is substituted into frequency L0, the frequency which is outputted from mixer 204 becomes (RF−IF)+IF=RF and original frequency RF is outputted from mixer 204.

The operation of mixer 208, filter 209, mixer 210 and local oscillator 212 at uplink signal amplification section 112 is the same as that of mixer 202, filter 203, mixer 204 and local oscillator 206 at downlink signal amplification section 111.

The frequency selection information of the above-described analysis information includes reception quality information of the received signal, path loss value information of the received signal or base station interference power information of the received signal.

In repeater 500 according to Embodiment 4 of the present invention, when the analysis information has the frequency selection information corresponding to the received signal with a highest reception quality, frequency selection section 502 is configured so as to select the amplification frequency of the downlink signal amplification section 111 and uplink signal amplification section 112 corresponding to the frequency selection information.

In repeater 500 according to Embodiment 4 of the present invention, when the analysis information has the frequency selection information corresponding to the received signal with a minimum path loss, frequency selection section 502 may also be configured so as to select amplification frequencies of the downlink signal amplification section 111 and uplink signal amplification section 112 corresponding to the frequency selection information.

In repeater 500 according to Embodiment 4 of the present invention, when the analysis information has the frequency selection information corresponding to the received signal with minimum base station interference power, frequency selection section 502 may also be configured so as to select amplification frequencies of the downlink signal amplification section 111 and uplink signal amplification section 112 corresponding to the frequency selection information.

In this way, according to this Embodiment 4, information of a broadcast channel of a received signal is analyzed to generate analysis information, amplification frequencies of the downlink signal amplification section and the uplink signal amplification section are selected based on the analysis information, so that it is possible to prevent large noise such as an interference signal other than the selected frequency band from being amplified, and thereby have no negative influence on the base station.

Embodiment 5

Figure 7:
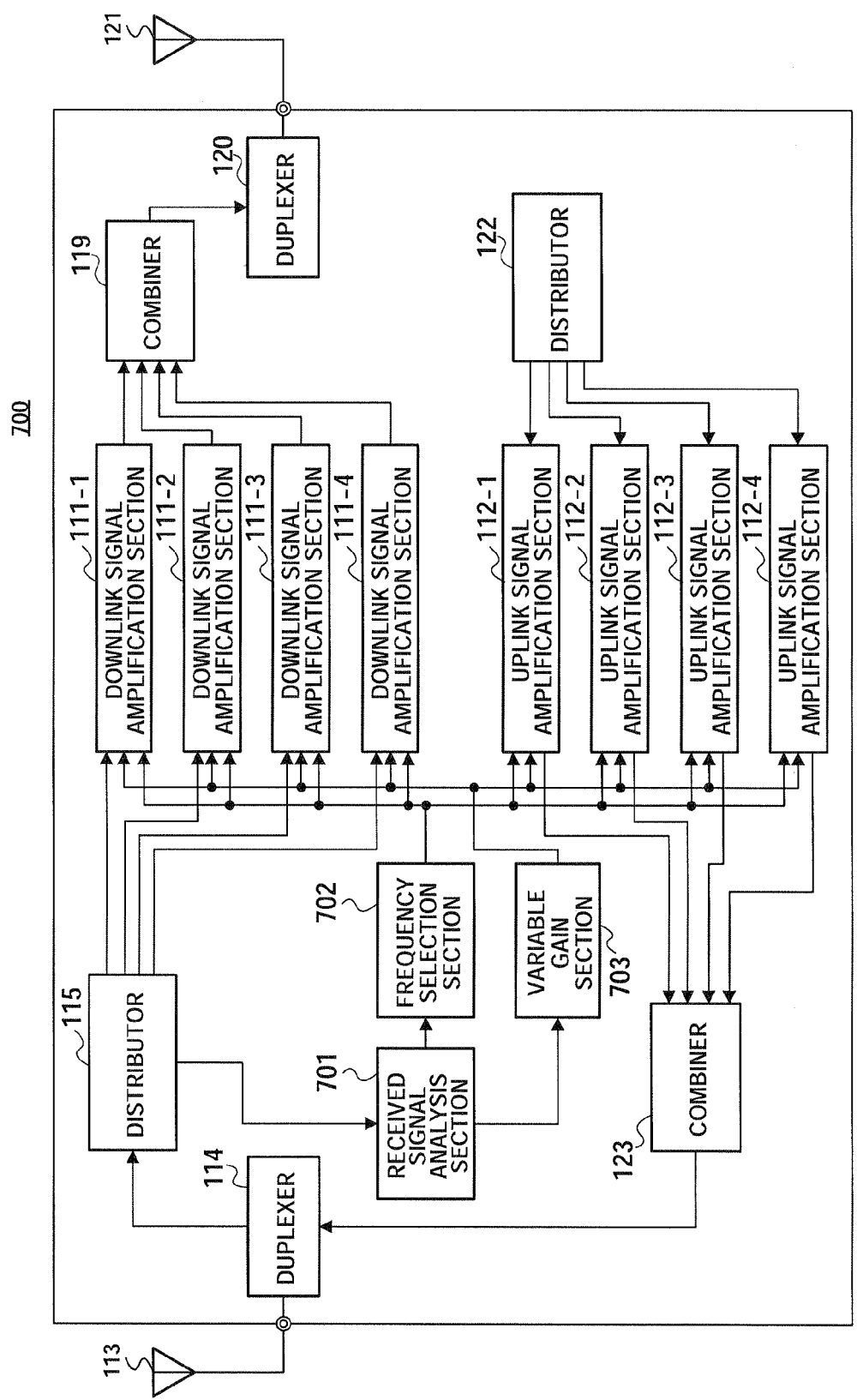
FIG. 7 is a block diagram showing the configuration of a repeater according to Embodiment 5 of the present invention.

Next, Embodiment 5 of the present invention will be explained with reference to the accompanying drawings. FIG. 7 is a block diagram showing the configuration of a repeater according to Embodiment 5 of the present invention. In Embodiment 5 of the present invention, the same components as those in Embodiment 1 of the present invention will be assigned the same reference numerals without further explanations.

As shown in FIG. 7, repeater 700 according to Embodiment 5 of the present invention is provided with downlink signal amplification sections 111-1 to 111-4, uplink signal amplification sections 112-1 to 112-4, outdoor antenna 113, duplexer 114, distributor 115, combiner 123, received signal analysis section 701, frequency selection section 702, variable gain section 703, combiner 119, distributor 122, duplexer 120 and indoor antenna 121.

Distributor 115 distributes a downlink signal received from a base station through outdoor antenna 113 and duplexer 114 to a plurality of downlink signal amplification sections 111-1 to 111-4 and received signal analysis section 701.

Received signal analysis section 701 receives the downlink signal from the base station through outdoor antenna 113, duplexer 114 and distributor 115. Received signal analysis section 701 analyzes information of a broadcast channel of the downlink signal (received signal), generates analysis information, and gives it to frequency selection section 702 and variable gain section 703. This analysis information has frequency selection information. In the case of, for example, WCDMA of 3GPP, the frequency selection information is RSCP (Received Signal Code Power) information calculated from CPICH or transmission power (TxPower) information which can be acquired from CPICH and RSCP information calculated from CPICH. Received signal analysis section 701 may control the selection of an amplification frequency according to the calculated RSCP information for frequency selection section 702 or calculate a path loss based on the acquired TxPower information and the calculated RSCP information and control the selection of the amplification frequency based on the calculating path loss information.

Frequency selection section 702 which is an output control section receives the analysis information from received signal analysis section 701, selects amplification frequencies to be allocated to downlink signal amplification sections 111 and uplink signal amplification sections 112 based on the frequency selection information of this analysis information, generates frequency selection signals, and gives them to downlink signal amplification sections 111 and uplink signal amplification sections 112. In the case where there are a plurality of frequencies that can be received in the frequency selection information, frequency selection section 702 allocates frequencies to downlink amplification sections 111-1 to 111-4 and uplink amplification sections 112-1 to 112-4 in descending order of the reception quality, that is, descending order of the RSCP or ascending order of the path loss. In this case, frequency selection section 702 sets different frequencies to downlink amplification sections 111-1 to 111-4 and uplink amplification sections 112-1 to 112-4. Furthermore, frequency selection section 702 always monitors broadcast information of a plurality of frequencies which can be received, and, when ranking of frequencies of a good reception quality is changed, frequency selection section 702 re-inspects neighboring frequencies once again and re-allocates frequencies to downlink amplification sections 111-1 to 111-4 and uplink amplification sections 112-1 to 112-4 in descending order of the reception quality.

When there are differences in the reception levels of frequencies which can be received, variable gain section 703 changes the gain of downlink amplification sections 111-1 to 111-4 and uplink amplification sections 112-1 to 112-4 according to the intensity of the reception levels based on the analysis information inputted from received signal analysis section 701. This allows repeater 700 to maintain a good reception quality inside.

Embodiment 6

Figure 8:
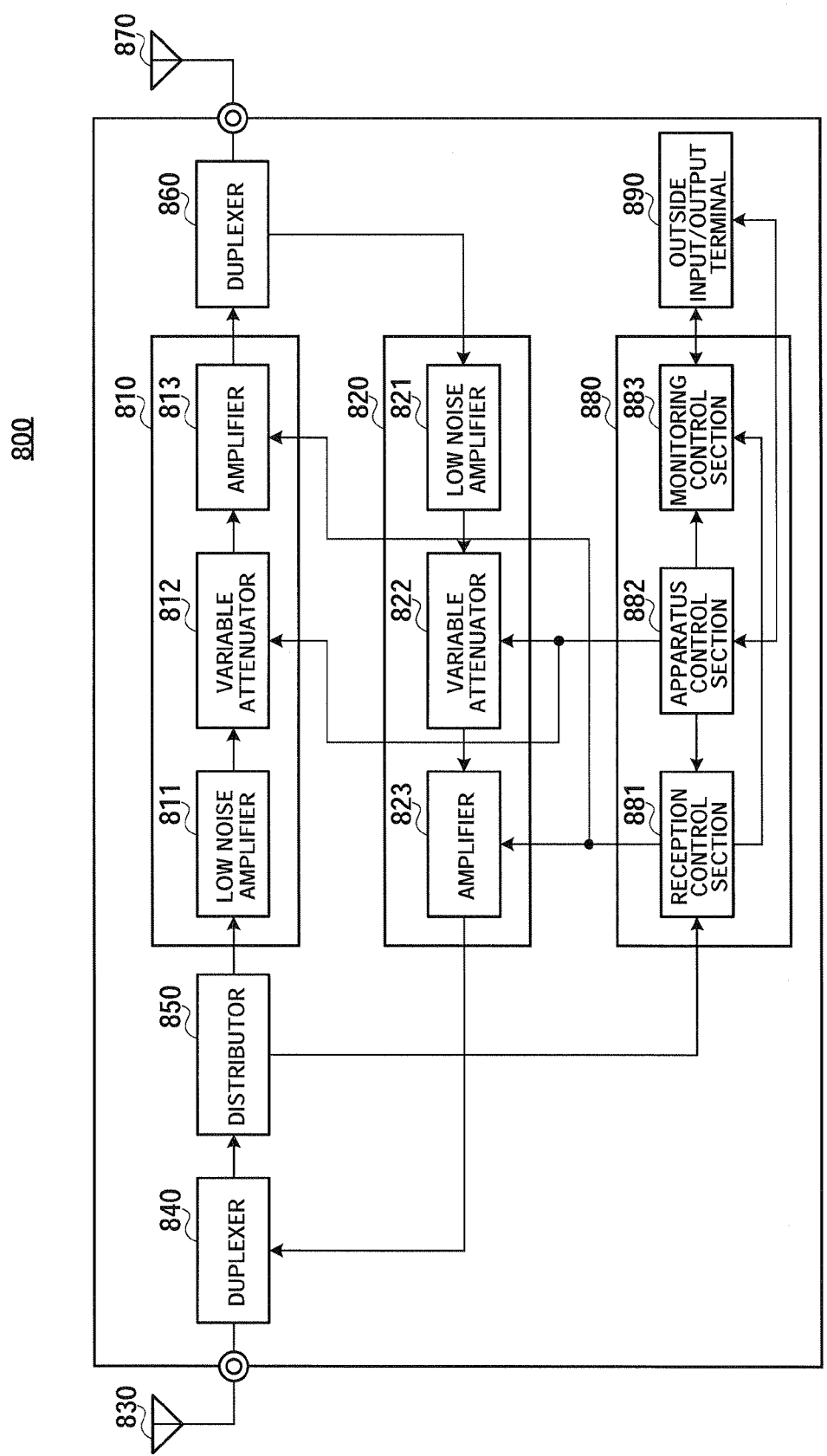
FIG. 8 is a block diagram showing the configuration of a repeater according to Embodiment 6 of the present invention.

FIG. 8 is a block diagram showing the configuration of a repeater according to Embodiment 6 of the present invention. As shown in FIG. 8, repeater 800 according to this Embodiment 6 is provided with downlink signal amplification section 810, uplink signal amplification section 820, outdoor antenna 830, duplexer 840, distributor 850, duplexer 860, indoor antenna 870, control section 880 and outside input/output terminal 890.

Downlink signal amplification section 810 is provided with low noise amplifier 811, variable attenuator 812 and amplifier 813. Uplink signal amplification section 820 is provided with low noise amplifier 821, variable attenuator 822 and amplifier 823. Control section 880 is provided with reception control section 881, apparatus control section 882 and monitoring control section 883.

Outdoor antenna 830 transmits/receives a signal to/from a base station located outdoors. Outdoor antenna 830 gives a radio signal received from the base station to downlink signal amplification section 810 through duplexer 840 and distributor 850. Furthermore, outdoor antenna 830 receives a signal from uplink signal amplification section 820 through duplexer 840 and transmits it to the base station as a radio signal.

Distributor 850 distributes a signal received from the base station through outdoor antenna 830 and duplexer 840 to low noise amplifier 811 of downlink signal amplification section 810 and reception control section 881 of control section 880.

Downlink signal amplification section 810 amplifies the signal from distributor 850 according to gain of amplification (amplification factor) specified from control section 880 and transmits the result to duplexer 860. Low noise amplifier 811 amplifies the signal received from the base station apparatus through duplexer 840 at a specified amplification factor and gives the result to variable attenuator 812.

Variable attenuator 812 attenuates the signal from low noise amplifier 811 and gives the result to amplifier 813. At this time, variable attenuator 812 changes an attenuation factor according to an instruction from apparatus control section 882. Amplifier 813 amplifies the signal from variable attenuator 812 at an amplification factor instructed from reception control section 881 and gives the result to indoor antenna 870 through duplexer 860.

Duplexer 860 receives the signal from amplifier 813 and gives it to indoor antenna 870. Furthermore, duplexer 860 receives a signal from a communication terminal apparatus through indoor antenna 870 and gives it to uplink signal amplification section 820. Indoor antenna 870 receives the signal from amplifier 813 through duplexer 860 and transmits it to the communication terminal apparatus as a radio signal.

Uplink signal amplification section 820 amplifies the signal received from the communication terminal apparatus through duplexer 860 at an amplification factor specified by control section 880 and transmits the result to duplexer 840.

Low noise amplifier 821 amplifies the signal received from the communication terminal apparatus through duplexer 860 at a specified amplification factor and gives the result to variable attenuator 822.

Variable attenuator 822 attenuates the signal from low noise amplifier 821 and gives the result to amplifier 823. At this time, variable attenuator 822 changes an attenuation factor according to an instruction from apparatus control section 882. Amplifier 823 amplifies the signal from variable attenuator 822 at an amplification factor instructed by reception control section 881 and gives the result to outdoor antenna 830 through duplexer 840.

Duplexer 840 receives the signal from amplifier 823 and gives it to outdoor antenna 830. Outdoor antenna 830 receives the signal from amplifier 823 through duplexer 840 and transmits it to the base station as a radio signal.

Control section 880 receives the signal from the base station through outdoor antenna 830, duplexer 840 and distributor 850, controls the gain of amplification (amplification factors) to be set in downlink signal amplification section 810 and uplink signal amplification section 820 based on the information of the received signal. Control section 880 is provided with reception control section 881, apparatus control section 882 and monitoring control section 883.

Reception control section 881 receives the signal from the base station through outdoor antenna 830, duplexer 840 and distributor 850, analyzes the information of the received signal and controls the amplification factors to be set in amplifier 813 and amplifier 823 according to the analysis result.

Apparatus control section 882 controls downlink signal amplification section 810, uplink signal amplification section 820 and reception control section 881 and moreover has the function of making connection with an outside communication terminal apparatus through outside input/output terminal 890.

Monitoring control section 883 reports operation information inside the apparatus collected from reception control section 881 and apparatus control section 882 to an outside integrated monitoring apparatus through outside input/output terminal 890. Outside input/output terminal 890 has the function of making connection between the outside communication terminal apparatus and apparatus control section 882 and the function of making connection between the outside integrated monitoring apparatus and monitoring control section 883.

Figure 9:
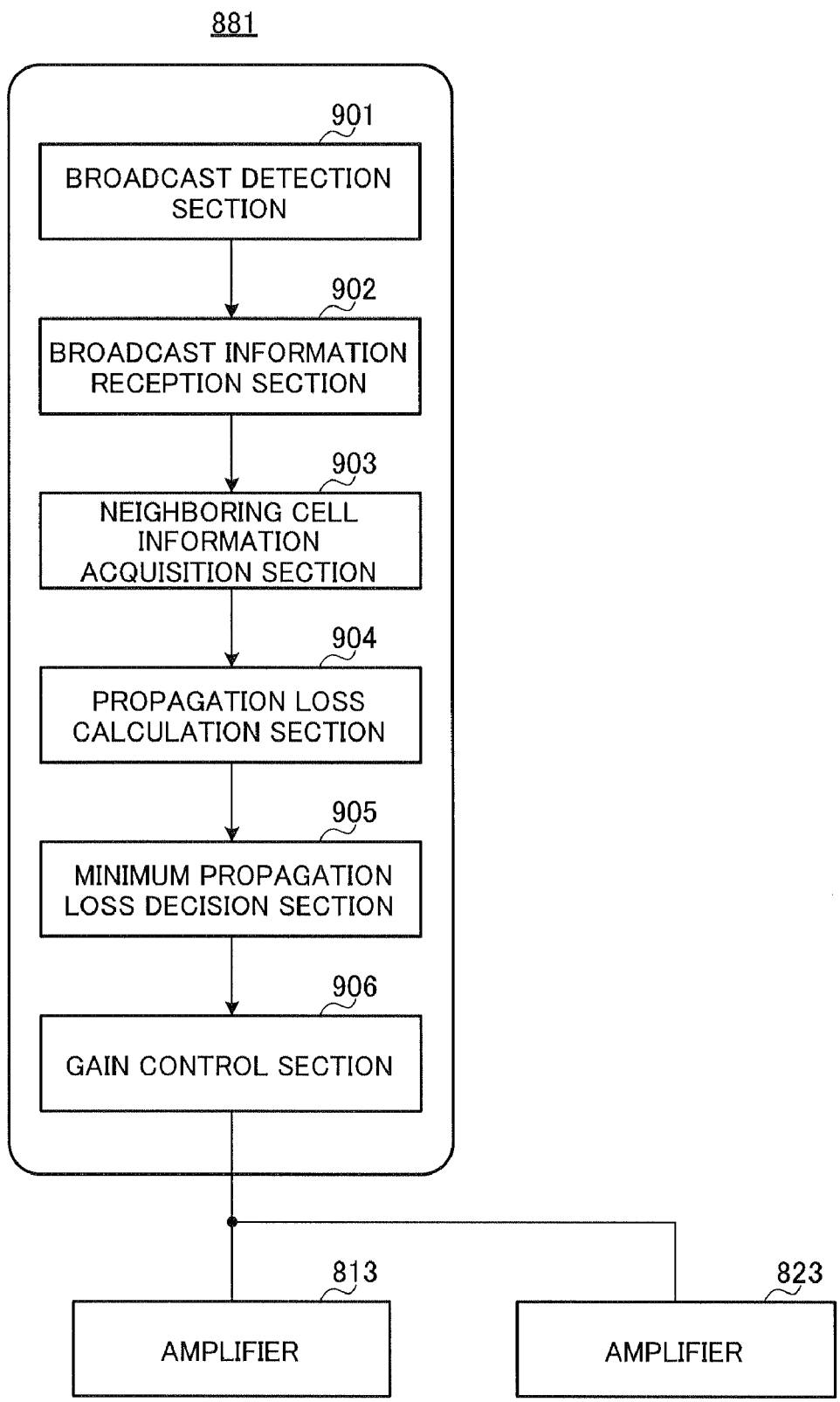
FIG. 9 is a block diagram showing the configuration of the reception control section of the repeater according to Embodiment 6 of the present invention.

Next, reception control section 881 of repeater 800 according to this Embodiment 6 will be explained with reference to FIG. 8 and FIG. 9 in detail. FIG. 9 is a block diagram showing the configuration of reception control section 881 of repeater 800 according to this Embodiment 6.

As shown in FIG. 9, reception control section 881 of repeater 800 according to this Embodiment 6 is provided with perch detection section 901, broadcast information reception section 902, neighboring cell information acquisition section 903, propagation loss calculation section 904, minimum propagation loss decision section 905 and gain control section 906.

Perch detection section 901 detects a broadcast channel which is a reference signal transmitted by the base station and measures the reception level. Broadcast information reception section 902 receives broadcast information which is a signal storing base station information transmitted through the broadcast channel.

Neighboring cell information acquisition section 903 decodes the broadcast information from broadcast information reception section 902 and acquires neighboring cell information which stores information of a plurality of neighboring cells. Propagation loss calculation section 904 measures the received signal level of the plurality of neighboring cells based on the neighboring cell information which contains transmission power values from neighboring cell information acquisition section 903 and calculates propagation loss of each cell.

Minimum propagation loss decision section 905 compares a plurality of propagation losses from propagation loss calculation section 904 and decides a minimum propagation loss. Gain control section 906 controls the amplification gain of a signal to be transmitted/received according to the minimum propagation loss decided by minimum propagation loss decision section 905. That is, gain control section 906 controls the amplification factors of amplifier 813 and amplifier 823 according to the minimum propagation loss decided by minimum propagation loss decision section 905.

Embodiment 7

Figure 10:
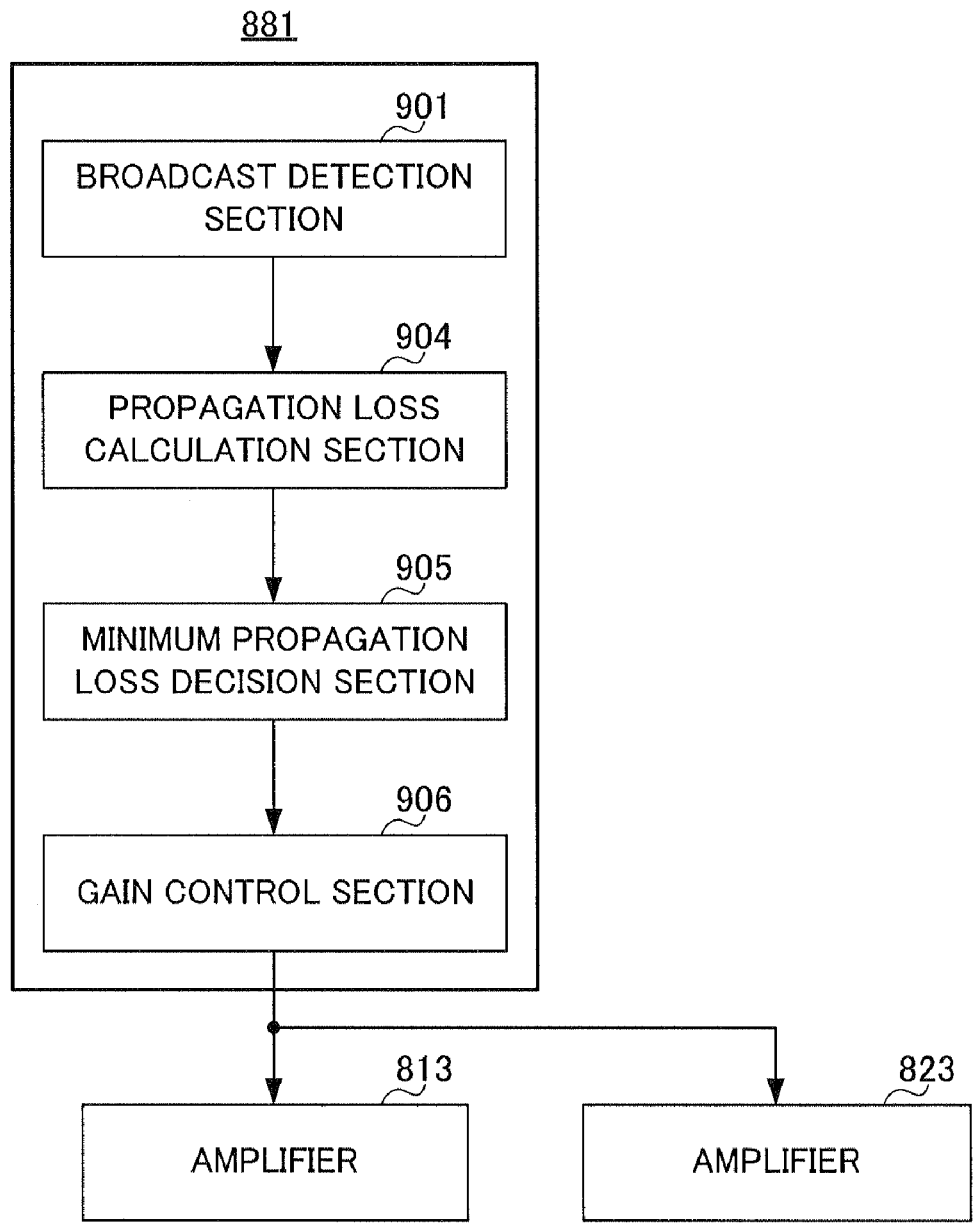
FIG. 10 is a block diagram showing the configuration of a reception control section of a repeater according to Embodiment 7 of the present invention.

FIG. 10 is a block diagram showing the configuration of reception control section 881 of the repeater according to Embodiment 7 of the present invention. As shown in FIG. 10, the broadcast information decoding function which is the function of reception control section 881 shown in above Embodiment 6 is removed from the repeater of this Embodiment 7. By removing the broadcast information decoding function, information which cannot be acquired by reception control section 881 is analyzed and acquired from outside by an area analyzer or the like and is set in the repeater. The repeater in this Embodiment 7 has the same configuration as that shown in FIG. 8 except the broadcast information decoding function of reception control section 881 which has been removed, and therefore explanations thereof will be omitted. In FIG. 10, the same components as those in FIG. 9 will be assigned the same reference numerals without further explanations.

Thus, according to this Embodiment 7, even when the function of the repeater is made simpler, the same effect as that of the repeater shown in Embodiment 6 is obtained by setting information which has become impossible to be decoded by the repeater from outside.

Embodiment 8

Figure 11:
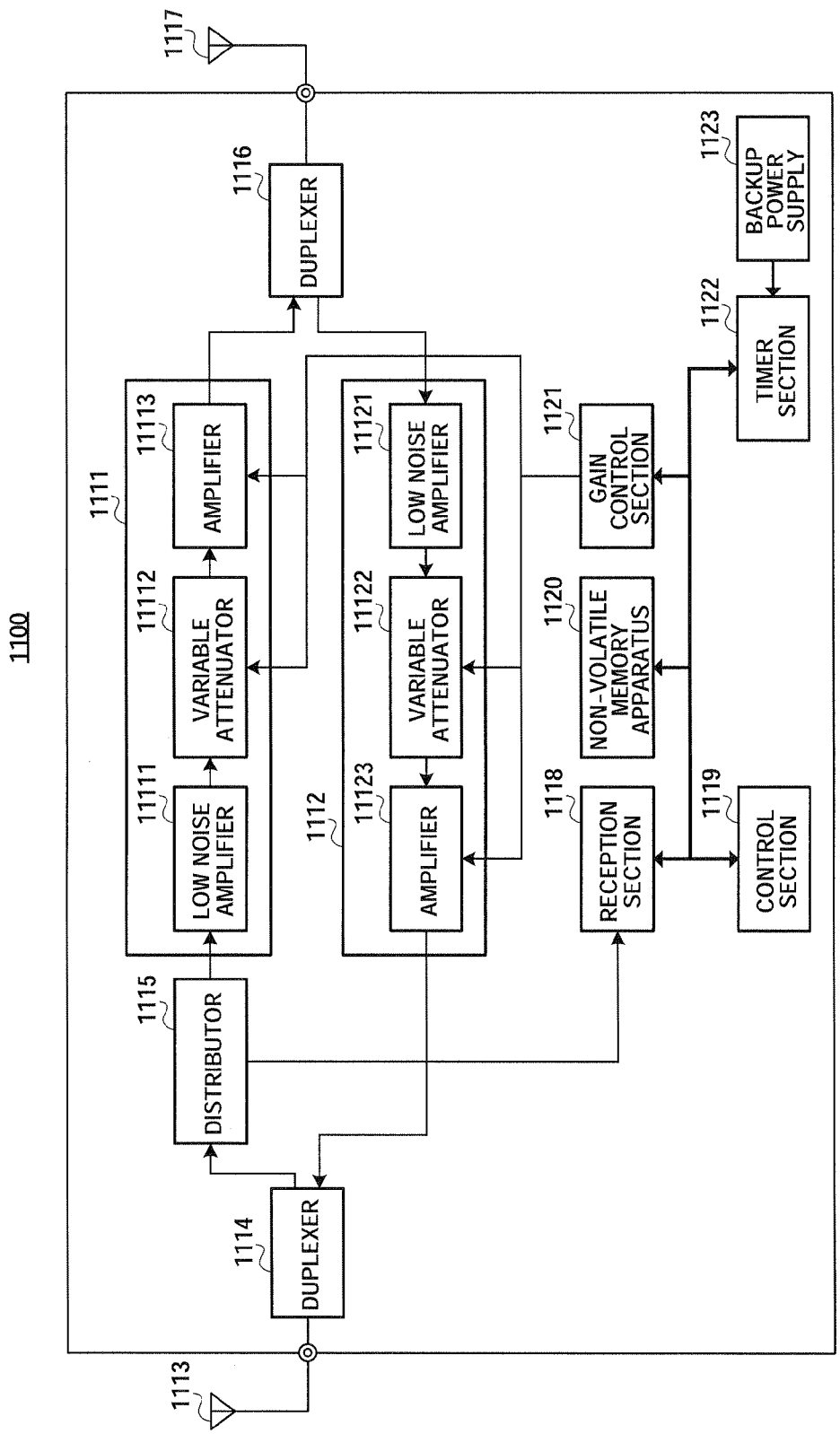
FIG. 11 is a block diagram showing the configuration of a repeater according to Embodiment 8 of the present invention.

FIG. 11 is a block diagram showing the configuration of a repeater according to Embodiment 8 of the present invention. As shown in FIG. 11, repeater 1100 according to Embodiment 8 of the present invention is provided with downlink signal amplification section 1111, uplink signal amplification section 1112, outdoor antenna 1113, duplexer 1114, distributor 1115, duplexer 1116, indoor antenna 1117, reception section 1118, control section 1119, non-volatile memory apparatus 1120, gain control section 1121, timer section 1122 and backup power supply 1123.

Downlink signal amplification section 1111 is provided with low noise amplifier 11111, variable attenuator 11112 and amplifier 11113. Uplink signal amplification section 1112 is provided with low noise amplifier 11121, variable attenuator 11122 and amplifier 11123.

Outdoor antenna 1113 transmits/receives a signal to/from a base stations located outdoors. Outdoor antenna 1113 receives a signal (radio signal) from the base station, generates a received signal and gives it to downlink signal amplification section 1111 through duplexer 1114 and distributor 1115. Furthermore, outdoor antenna 1113 receives a signal from uplink signal amplification section 1112 through duplexer 1114 and transmits it to the base station as a radio signal.

Distributor 1115 distributes a signal received from the base station through outdoor antenna 1113 and duplexer 1114 to low noise amplifier 11111 at downlink signal amplification section 1111 and reception section 1118.

Downlink signal amplification section 1111 amplifies the signal from distributor 1115 according to gain of amplification (amplification factor) specified from gain control section 1121 and transmits the result to duplexer 1116. Low noise amplifier 11111 amplifies the signal received from the base station apparatus through duplexer 1114 and distributor 1115 at a specified amplification factor and gives the result to variable attenuator 11112.

Variable attenuator 11112 attenuates the signal from low noise amplifier 11111 and gives the result to amplifier 11113. At this time, variable attenuator 11112 changes the attenuation factor according to an instruction from gain control section 1121. Amplifier 11113 amplifies the signal from variable attenuator 11112 at an amplification factor instructed by gain control section 1121 and gives the result to indoor antenna 1117 through duplexer 1116.

Duplexer 1116 receives the signal from amplifier 11113 and gives it to indoor antenna 1117. Furthermore, duplexer 1116 receives a signal from a communication terminal apparatus and gives it to uplink signal amplification section 1112. Indoor antenna 1117 receives the signal from amplifier 11113 through duplexer 1116 and transmits it to the communication terminal apparatus as a radio signal.

Uplink signal amplification section 1112 amplifies the signal received from the communication terminal apparatus through duplexer 1116 at an amplification factor specified by gain control section 1121 and transmits the result to duplexer 1114.

Low noise amplifier 11121 amplifies the signal received from the communication terminal apparatus through duplexer 1116 at a specified amplification factor and gives the result to variable attenuator 11122.

Variable attenuator 11122 attenuates the signal from low noise amplifier 11121 and gives the result to amplifier 11123. At this time, variable attenuator 11122 changes the attenuation factor according to an instruction from gain control section 1121. Amplifier 11123 amplifies the signal from variable attenuator 11122 at an amplification factor instructed by gain control section 1121 and gives the result to outdoor antenna 1113 through duplexer 1114.

Duplexer 1114 receives the signal from amplifier 11123 and gives it to outdoor antenna 1113. Outdoor antenna 1113 receives the signal from amplifier 11123 through duplexer 1114 and transmits it to the base station as a radio signal.

Reception section 1118 receives a base station signal from the base station through outdoor antenna 1113, duplexer 1114 and distributor 1115, decodes control channel information of the base station signal and also gives reception level information of the received signal to control section 1119. Furthermore, reception section 1118 receives the signal from the base station through outdoor antenna 1113, duplexer 1114 and distributor 1115, generates a received signal, detects the reception level of this received signal and gives the reception level to control section 1119.

Control section 1119 decides gain of amplification (amplification factors) to be set in downlink signal amplification section 1111 and uplink signal amplification section 1112 based on the information from reception section 1118 and gives an instruction to gain control section 1121. Furthermore, control section 1119 writes information into non-volatile memory apparatus 1120 and also reads information from non-volatile memory apparatus 1120. Furthermore, control section 1119 controls timer section 1122.

Gain control section 1121 controls the gain of amplification (amplification factors) of downlink signal amplification section 1111 and uplink signal amplification section 1112 based on the instruction from control section 1119.

Non-volatile memory apparatus 1120 stores information such as the reception level of broadcast information and stores the written information even if the power supply to repeater 1100 is stopped. Timer section 1122 measures a time and a date and gives time information to control section 1119. Backup power supply 1123 backs up power so that the time information in timer section 1122 is not lost when the power supply to repeater 1100 stops.

Next, repeater 1100 according to Embodiment 8 of the present invention will be explained in detail with reference to FIG. 11 and FIG. 12.

Control section 1119 writes the reception level of the broadcast information from reception section 1118 and the time information from timer section 1122 in non-volatile memory apparatus 1120 and stores the information. Control section 1119 detects a small fluctuation time zone where fluctuation in the reception level is small based on the reception level and the time information stored in non-volatile memory apparatus 1120 and gives an instruction for controlling gain to gain control section 1121 based on the reception level in the small fluctuation time zone. That the fluctuation in the reception level is small indicates that the difference between the previous reception level and the reception level at this time is equal to or below a threshold.

Figure 12:
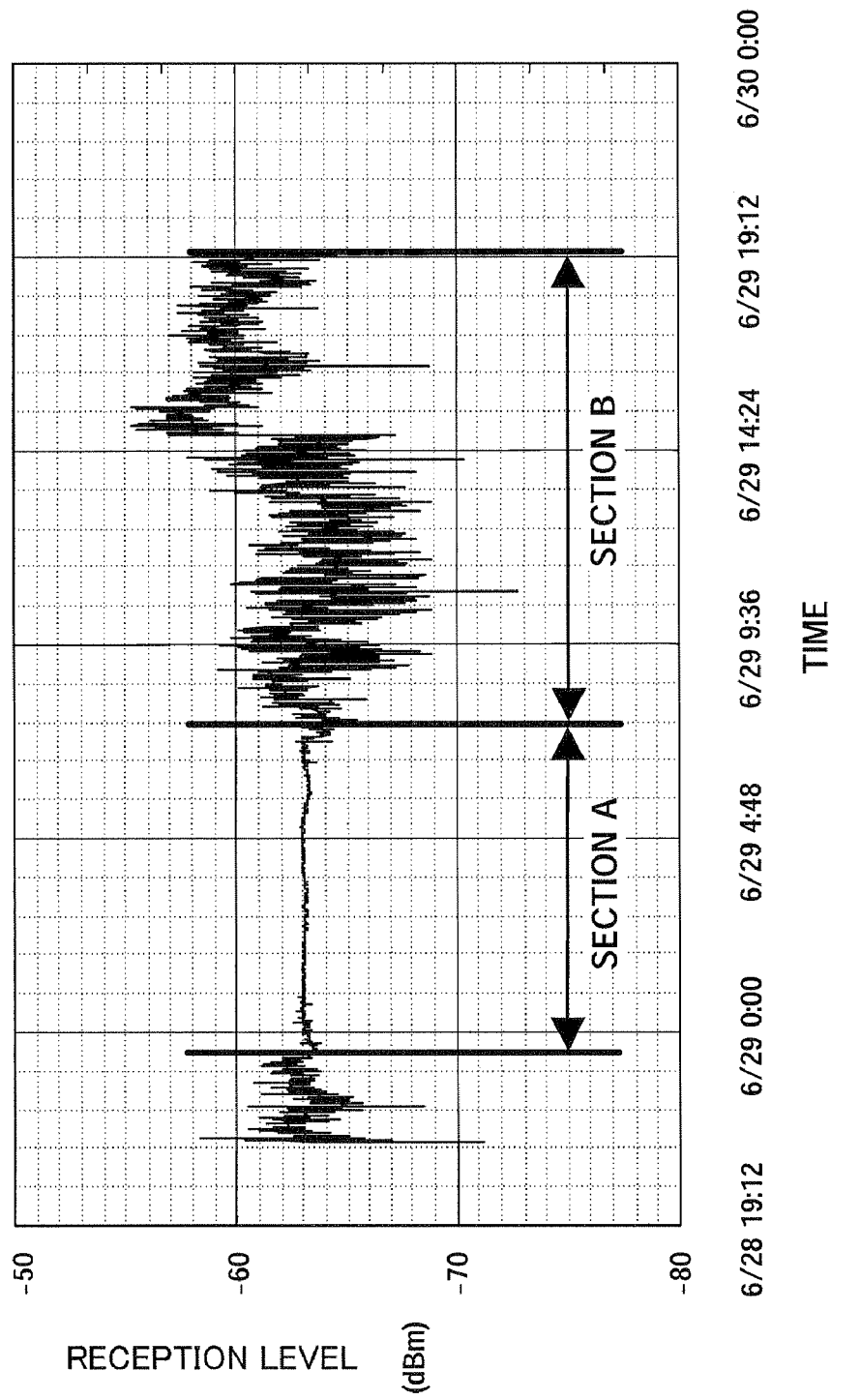
FIG. 12 illustrates the operation of the repeater according to Embodiment 8 of the present invention.

When, for example, the reception level of the broadcast information and the time information are as shown in FIG. 12, control section 1119 detects a small fluctuation time zone (section A) where the fluctuation in the reception level is small and gives an instruction for controlling gain based on the reception level in this section A to gain control section 1121. Gain control section 1121 controls the gain of amplification (amplification factors) of downlink signal amplification section 1111 and uplink signal amplification section 1112 based on the instruction from control section 1119.

Embodiment 9

Figure 13:
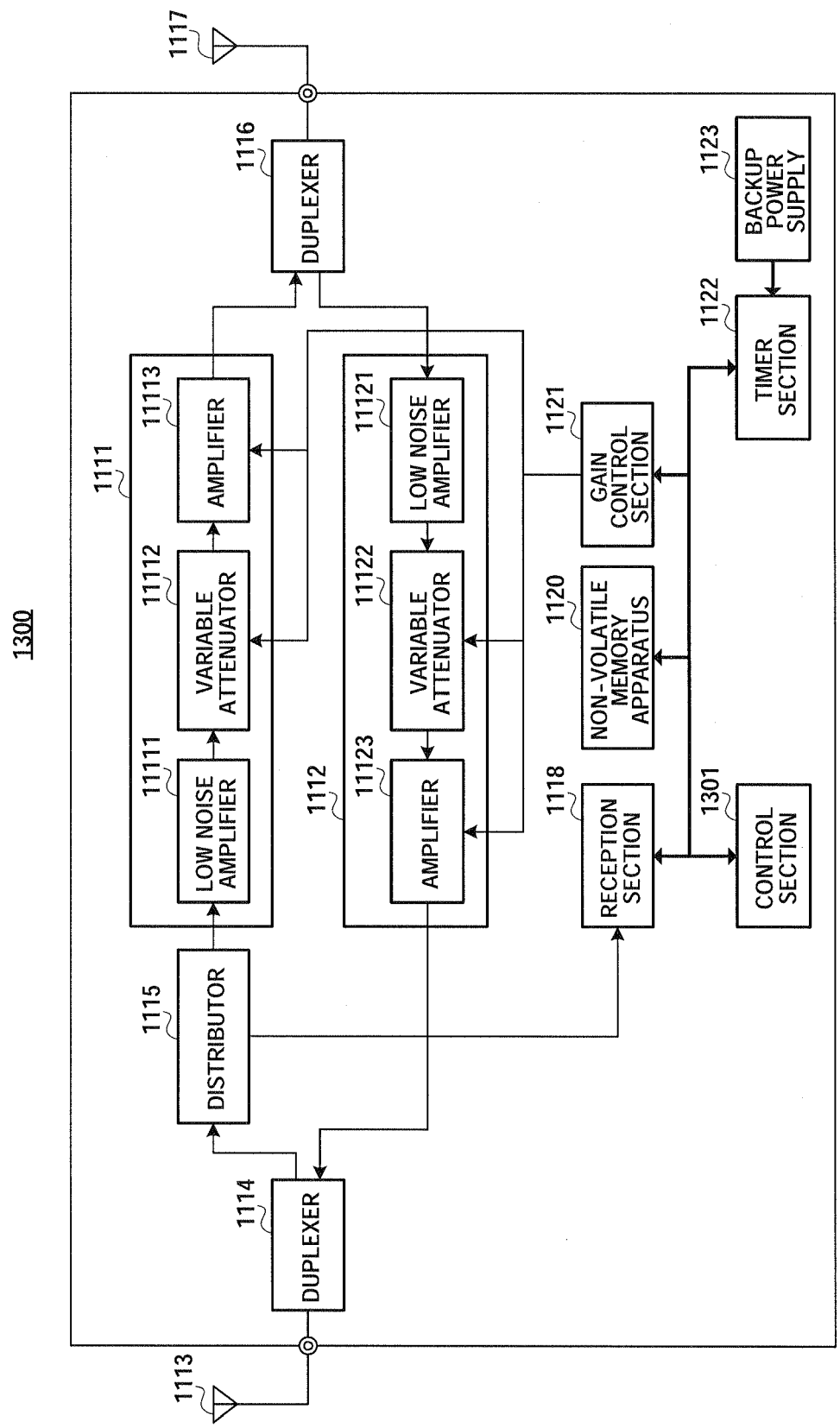
FIG. 13 is a block diagram showing the configuration of a repeater according to Embodiment 9 of the present invention.

Next, Embodiment 9 of the present invention will be explained in detail with reference to the accompanying drawings. FIG. 13 is a block diagram showing the configuration of a repeater according to Embodiment 9 of the present invention. In Embodiment 9 of the present invention, the same components as those in Embodiment 8 of the present invention will be assigned the same reference numerals without further explanations.

As shown in FIG. 13, repeater 1300 according to Embodiment 9 of the present invention is provided with control section 1301 instead of control section 1119 in Embodiment 8 of the present invention.

That is, repeater 1300 according to Embodiment 9 of the present invention is provided with downlink signal amplification section 1111, uplink signal amplification section 1112, outdoor antenna 1113, duplexer 1114, distributor 1115, duplexer 1116, indoor antenna 1117, reception section 1118, control section 1301, non-volatile memory apparatus 1120, gain control section 1121, timer section 1122 and backup power supply 1123.

Next, the operation of repeater 1300 according to Embodiment 9 of the present invention which is different from Embodiment 8 of the present invention will be explained with reference to FIG. 13 and FIG. 12.

Control section 1301 detects fluctuation in the reception level based on the reception level and time information of broadcast information stored in non-volatile memory apparatus 1120, calculates an average of the reception level per predetermined time in a large fluctuation time zone where the detected fluctuation in the reception level is large and gives an instruction for controlling the gain based on the average to gain control section 1121. That the fluctuation in the reception level is large indicates that the difference between the previous reception level and the reception level at this time is larger than a threshold.

When, for example, the reception level of the broadcast information and the time information are as shown in FIG. 12, control section 1301 calculates an average of the reception level per predetermined time in the large fluctuation time zone (section B) where the fluctuation in the reception level is large and gives an instruction for controlling the gain based on the average to gain control section 1121. Gain control section 1121 controls the gain of amplification (amplification factors) of downlink signal amplification section 1111 and uplink signal amplification section 1112 based on the instruction from control section 1301. By this means, it is possible to control the gain also reflecting the influence of fading.

Figure 14:
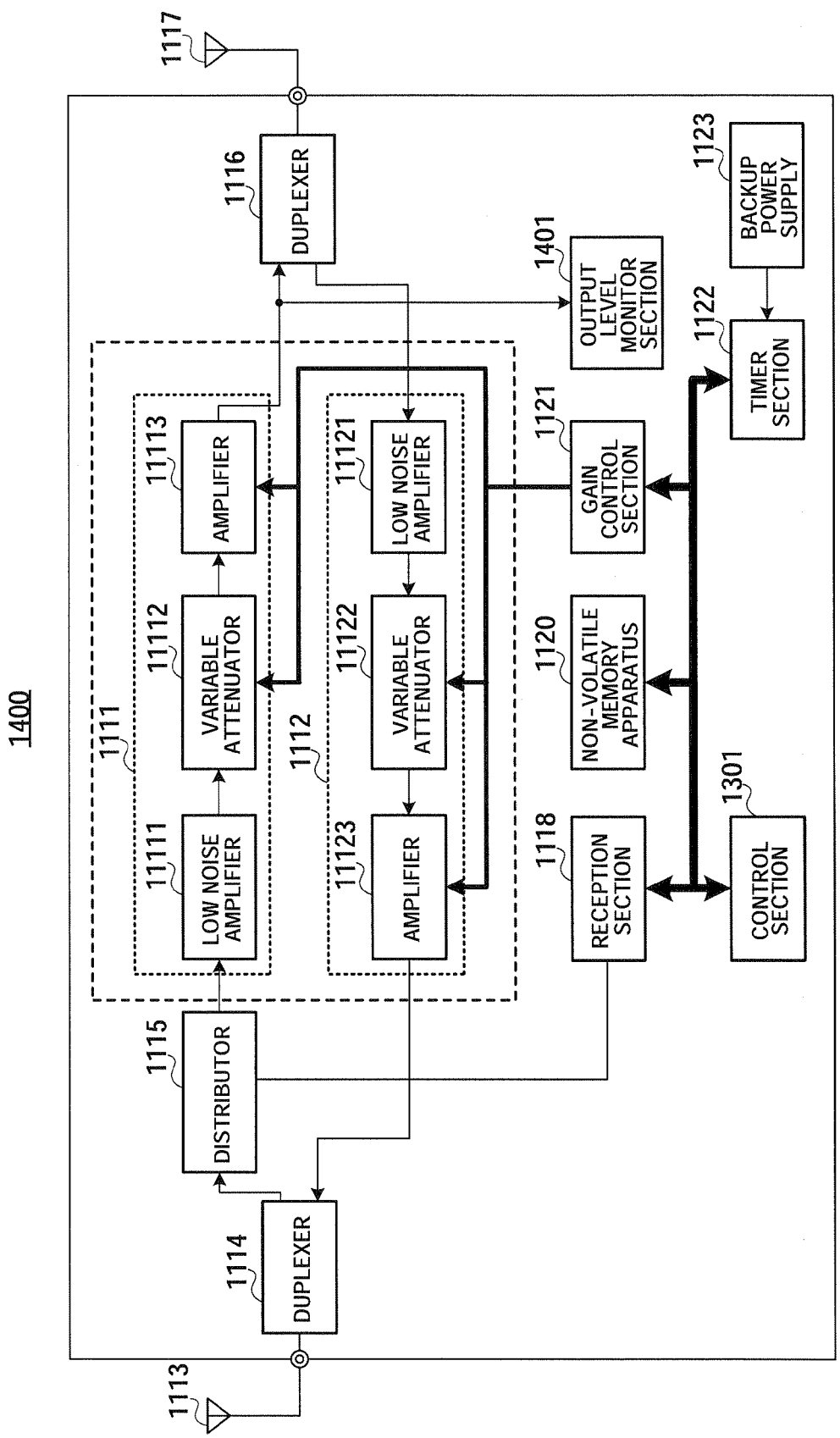
FIG. 14 is a block diagram showing the configuration of another repeater according to Embodiment 9 of the present invention.
Figure 15:
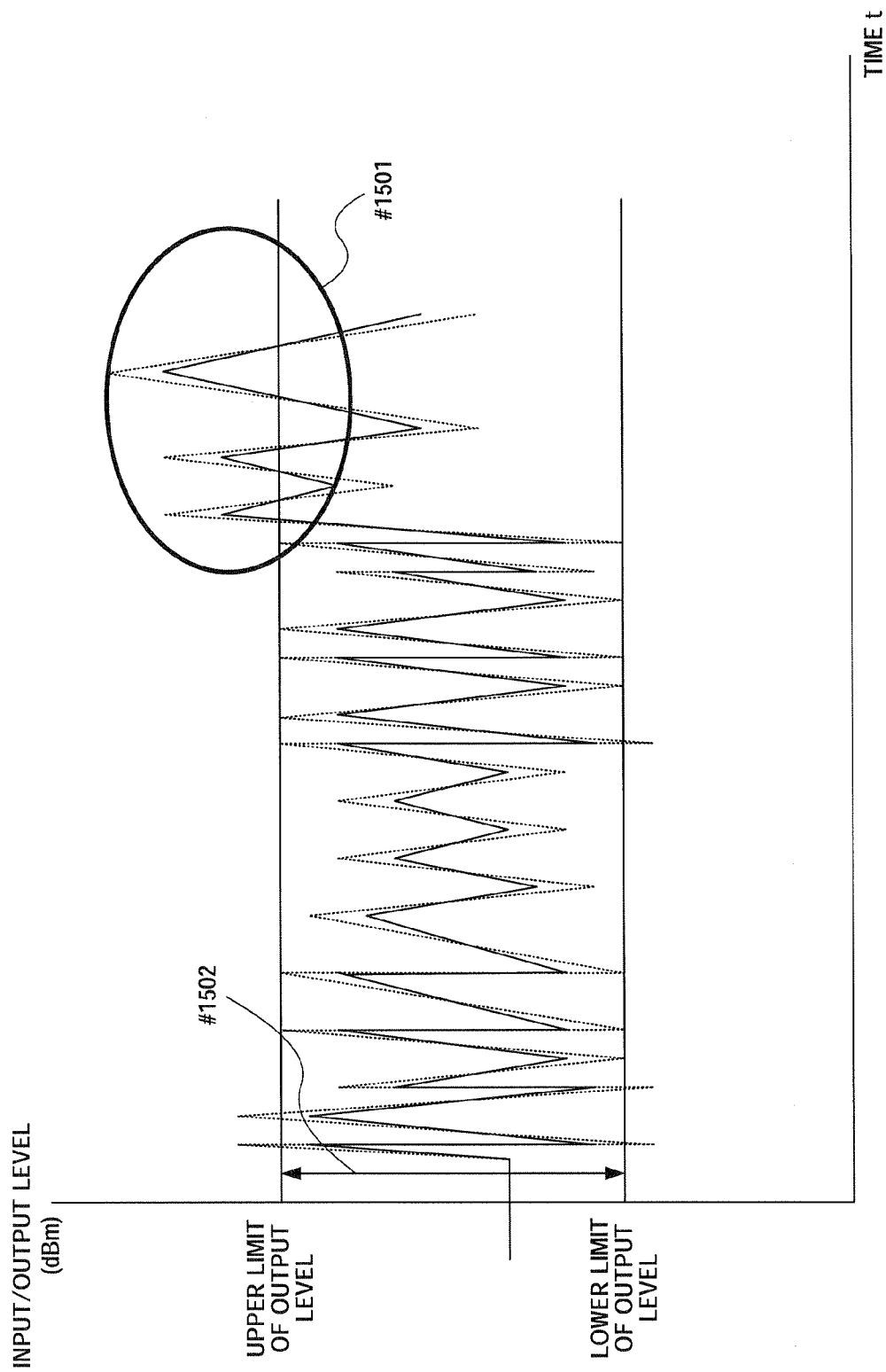
FIG. 15 illustrates time transition of an input/output level according to Embodiment 9 of the present invention.

To judge whether or not gain control using the average has been optimized, it is also possible to provide downlink output level monitor section 1401 which monitors the downlink output level of repeater 1400 as shown in FIG. 14. FIG. 14 is a block diagram showing an other example of the repeater according to this Embodiment 9. In FIG. 14, the same components as those in FIG. 13 will be assigned the same reference numerals without further explanations. In FIG. 14, information of a monitoring result at output level monitor section 1401 is averaged per predetermined time, and whether or not optimization has been performed is judged based on whether or not the average value falls within a predetermined range. This image will be explained in FIG. 15. In FIG. 15, the dotted line shows an input level and the solid line shows an output level. Output level monitor section 1401 monitors fluctuation of the downlink input level due to fading, and can thereby judge whether or not the output level has became constant through the gain control by gain control section 1121 of repeater 1400. Gain control section 1121 performs gain control so that the output level falls within constant range #1502 not more than an upper limit of the output level and not less than a lower limit of the output level. When the output level is not suppressed to a constant level, that is, when it is greater than the upper limit of the output level (in case of #1501) or when it is less than the lower limit of the output level, control is performed so that the gain control period is expedited to obtain good response, and the output level is suppressed to the upper limit of the output level or below.

Embodiment 10

Figure 16:
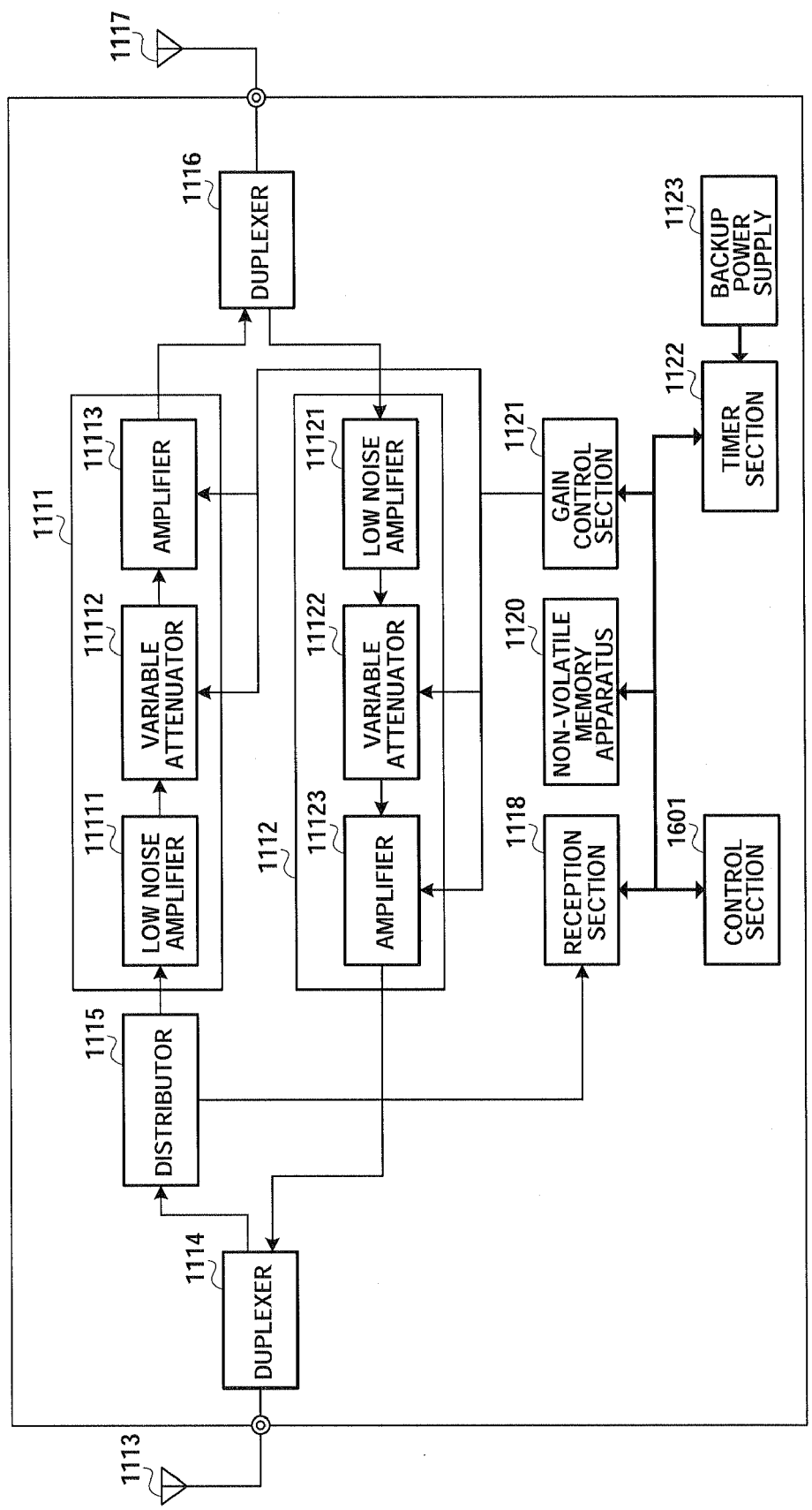
FIG. 16 is a block diagram showing the configuration of a repeater according to Embodiment 10 of the present invention.

Next, Embodiment 10 of the present invention will be explained in detail with reference to the accompanying drawings. FIG. 16 is a block diagram showing the configuration of a repeater according to Embodiment 10 of the present invention. In Embodiment 10 of the present invention, the same components as those in Embodiment 8 of the present invention will be assigned the same reference numerals without further explanations.

As shown in FIG. 16, repeater 1600 according to Embodiment 10 of the present invention is provided with control section 1601 instead of control section 1119 in Embodiment 8 of the present invention.

That is, repeater 1600 according to Embodiment 10 of the present invention is provided with downlink signal amplification section 1111, uplink signal amplification section 1112, outdoor antenna 1113, duplexer 1114, distributor 1115, duplexer 1116, indoor antenna 1117, reception section 1118, control section 1601, non-volatile memory apparatus 1120, gain control section 1121, timer section 1122 and backup power supply 1123.

Next, the operation of repeater 1600 according to Embodiment 10 of the present invention which is different from that of Embodiment 8 of the present invention will be explained with reference to FIG. 16 and FIG. 12.

Control section 1601 detects fluctuation in the reception level based on the reception level and the time information stored in non-volatile memory apparatus 1120, gives an instruction for controlling the gain based on the reception level in a small fluctuation time zone (section A in FIG. 12) where fluctuation in the reception level detected is small to gain control section 1121, calculates an average of the reception level per predetermined time in a large fluctuation time zone (section B in FIG. 12) where the fluctuation in the detected reception level is large and gives an instruction for controlling the gain based on the average to gain control section 1121. Gain control section 1121 controls the gain of amplification (amplification factors) of downlink signal amplification section 1111 and uplink signal amplification section 1112 based on the instruction from control section 1601.

In Embodiment 8 to Embodiment 10 of the present invention, the communication network system may also determine a timing of controlling the gain of repeaters 1100, 1300 and 1600 according to traffic information stored in the communication network system.

The present application is based on Japanese Patent Application No. 2004-359998, filed on Dec. 13, 2004, Japanese Patent Application No. 2004-306096, filed on Oct. 20, 2004 and Japanese Patent Application No. 2004-309301, filed on Oct. 25, 2004, entire content of which is expressly incorporated by reference herein.

INDUSTRIAL APPLICABILITY

The present invention provides an advantage of producing no negative influence on a base station and is suitable for use in a repeater.

The invention claimed is:

1. A repeater comprising:
   a received signal analysis section that analyzes information of a broadcast channel of a received signal from a base station to generate analysis information;
   a frequency selection section that selects frequencies in order from a frequency of a signal of highest reception quality according to the analysis information;
   a downlink signal amplification section that amplifies downlink signals per frequency selected in the frequency selection section;
   an uplink signal amplification section that amplifies uplink signals per frequency selected in the frequency selection section; and
   a stop control section that, when the reception quality is equal to or lower than a threshold, controls the downlink signal amplification section and the uplink signal amplification section to stop operating and not output signals.

2. The repeater according to claim 1, wherein the frequency selection section redoes the selection of frequencies when the reception quality changes.

3. The repeater according to claim 1, further comprising a variable gain section that variably sets gains in the uplink signal amplification section and the downlink signal amplification section, to which frequencies selected in the frequency selection section are allocated, based on one of the reception quality, path loss value and base station interference power according to the analysis information.

4. A repeater comprising:
   a received signal analysis section that analyzes information of a broadcast channel of a received signal from a base station to generate analysis information;
   a frequency selection section that selects frequencies in order from a frequency of a signal of a lowest path loss value according to the analysis information;
   a downlink signal amplification section that amplifies downlink signals per frequency selected in the frequency selection section;
   an uplink signal amplification section that amplifies uplink signals per frequency selected in the frequency selection section; and
   a stop control section that, when reception quality is equal to or lower than a threshold according to the analysis information, controls the downlink signal amplification section and the uplink signal amplification section to stop operating and not output signals.

5. The repeater according to claim 4, wherein the frequency selection section redoes the selection of frequencies when the reception quality changes.

6. The repeater according to claim 4, further comprising a variable gain section that variably sets gains in the uplink signal amplification section and the downlink signal amplification section, to which frequencies selected in the frequency selection section are allocated, based on one of the reception quality, path loss value and base station interference power according to the analysis information.

7. A repeater comprising:
   a received signal analysis section that analyzes information of a broadcast channel of a received signal from a base station to generate analysis information;
   a frequency selection section that selects frequencies in order from a frequency of a signal of lowest base station interference power according to the analysis information;
   a downlink signal amplification section that amplifies downlink signals per frequency selected in the frequency selection section;
   an uplink signal amplification section that amplifies uplink signals per frequency selected in the frequency selection section; and
   a stop control section that, when reception quality is equal to or lower than a threshold according to the analysis information, controls the downlink signal amplification section and the uplink signal amplification section to stop operating and not output signals.

8. The repeater according to claim 7, wherein the frequency selection section redoes the selection of frequencies when the reception quality changes.

9. The repeater according to claim 7, further comprising a variable gain section that variably sets gains in the uplink signal amplification section and the downlink signal amplification section, to which frequencies selected in the frequency selection section are allocated, based on one of the reception quality, path loss value and base station interference power according to the analysis information.

10. A repeater comprising:

a received signal analysis section that analyzes information of a broadcast channel of a received signal from a base station to generate analysis information;

a frequency selection section that selects frequencies in order from a frequency of a signal of highest reception quality according to the analysis information;

a downlink signal amplification section that amplifies downlink signals per frequency selected in the frequency selection section;

an uplink signal amplification section that amplifies uplink signals per frequency selected in the frequency selection section; and a stop control section that, when base station interference power is equal to or higher than a threshold according to the analysis information, controls the downlink signal amplification section and the uplink signal amplification section to stop operating and not output signals.

11. A repeater comprising:

a received signal analysis section that analyzes information of a broadcast channel of a received signal from a base station to generate analysis information;

a frequency selection section that selects frequencies in order from a frequency of a signal of a lowest path loss value according to the analysis information;

a downlink signal amplification section that amplifies downlink signals per frequency selected in the frequency selection section;

an uplink signal amplification section that amplifies uplink signals per frequency selected in the frequency selection section; and a stop control section that, when base station interference power is equal to or higher than a threshold according to the analysis information, controls the downlink signal amplification section and the uplink signal amplification section to stop operating and not output signals.

12. A repeater comprising:

a received signal analysis section that analyzes information of a broadcast channel of a received signal from a base station to generate analysis information;

a frequency selection section that selects frequencies in order from a frequency of a signal of lowest base station interference power according to the analysis information;

a downlink signal amplification section that amplifies downlink signals per frequency selected in the frequency selection section;

an uplink signal amplification section that amplifies uplink signals per frequency selected in the frequency selection section; and a stop control section that, when the base station interference power is equal to or higher than a threshold, controls the downlink signal amplification section and the uplink signal amplification section to stop operating and not output signals.

* * * * *